United States Patent
Hunt et al.

(10) Patent No.: US 10,148,748 B2
(45) Date of Patent: Dec. 4, 2018

(54) CO-LOCATING PEER DEVICES FOR PEER MATCHING

(71) Applicant: Microsoft Technology Licensing, LLC, Redmond, WA (US)

(72) Inventors: Brandon T. Hunt, Redmond, WA (US); Alexander Burba, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 15/052,757

(22) Filed: Feb. 24, 2016

(65) Prior Publication Data
US 2016/0255143 A1 Sep. 1, 2016

Related U.S. Application Data

(60) Provisional application No. 62/121,413, filed on Feb. 26, 2015.

(51) Int. Cl.
 G06F 15/173 (2006.01)
 H04L 29/08 (2006.01)

(52) U.S. Cl.
 CPC ........ *H04L 67/104* (2013.01); *H04L 67/1072* (2013.01); *H04L 67/1093* (2013.01); *H04L 67/18* (2013.01)

(58) Field of Classification Search
 CPC ............... H04L 67/104; H04L 67/1072; H04L 67/1093; H04L 67/18
 See application file for complete search history.

(56) References Cited

U.S. PATENT DOCUMENTS

| 6,463,471 B1 | 10/2002 | Dreke et al. |
| 7,657,769 B2 | 2/2010 | Marcy et al. |

(Continued)

FOREIGN PATENT DOCUMENTS

| CN | 103023928 A | 4/2013 |
| EP | 1741270 | 1/2007 |

(Continued)

OTHER PUBLICATIONS

"International Preliminary Report on Patentability Issued in PCT Application No. PCT/US2016/019623", dated Jan. 17, 2017, 6 Pages.

(Continued)

*Primary Examiner* — Jonathan A Bui
(74) *Attorney, Agent, or Firm* — Newport IP, LLC; Jacob P. Rohwer

(57) ABSTRACT

The techniques and systems described herein implement an improved peer matching service by coordinating peer matching requests across multiple peer matching nodes configured within a peer matching unit so that resource consumption can be spread out and resource limitations are not exceeded. Moreover, the peer matching service can determine if a peer matching unit is overloaded (e.g., experiencing an increased number of requests in a given time interval that is causing performance degradation), and the peer matching service can implement an action to scale out the number of requests within the peer matching unit (e.g., re-distribute some peer matching requests to another peer matching unit). In various examples, the peer matching service can determine if peer devices are co-located peer devices based on location information and can generate a list that prioritizes the co-located peer devices.

20 Claims, 11 Drawing Sheets

(56) References Cited

U.S. PATENT DOCUMENTS

| | | | |
|---|---|---|---|
| 7,720,996 B2 | 5/2010 | Soles et al. | |
| 7,738,404 B2 | 6/2010 | Deb et al. | |
| 7,783,777 B1* | 8/2010 | Pabla | G06F 17/30206 709/238 |
| 8,200,906 B2 | 6/2012 | Twiss et al. | |
| 8,458,333 B1 | 6/2013 | Stoica et al. | |
| 8,707,375 B2 | 4/2014 | Hainline | |
| 8,755,392 B2 | 6/2014 | Traversat et al. | |
| 8,825,081 B2 | 9/2014 | Arrasvuori et al. | |
| 8,843,413 B2 | 9/2014 | Robert et al. | |
| 9,680,926 B2* | 6/2017 | El-Beltagy | H04L 67/1046 |
| 2002/0055989 A1 | 5/2002 | Stringer-Calvert et al. | |
| 2003/0009518 A1* | 1/2003 | Harrow | H04L 47/10 709/203 |
| 2003/0018712 A1* | 1/2003 | Harrow | G06F 17/30206 709/203 |
| 2003/0064718 A1 | 4/2003 | Haines et al. | |
| 2006/0028994 A1 | 2/2006 | Hofmann et al. | |
| 2007/0064702 A1 | 3/2007 | Bates et al. | |
| 2007/0124721 A1 | 5/2007 | Cowing et al. | |
| 2008/0095163 A1* | 4/2008 | Chen | H04L 45/16 370/392 |
| 2008/0133767 A1 | 6/2008 | Birrer et al. | |
| 2008/0235331 A1 | 9/2008 | Melamed et al. | |
| 2009/0100128 A1 | 4/2009 | Czechowski, III et al. | |
| 2009/0240758 A1 | 9/2009 | Pasko et al. | |
| 2009/0285119 A1 | 11/2009 | Horn et al. | |
| 2009/0313310 A1 | 12/2009 | Thome et al. | |
| 2010/0061292 A1* | 3/2010 | Weinstein | H04B 7/2606 370/315 |
| 2010/0287611 A1 | 11/2010 | Blom et al. | |
| 2011/0022661 A1* | 1/2011 | Alsina | G06Q 10/109 709/205 |
| 2011/0191419 A1 | 8/2011 | Painter et al. | |
| 2012/0079022 A1* | 3/2012 | Kim | G06Q 30/0261 709/204 |
| 2012/0191860 A1 | 7/2012 | Traversat et al. | |
| 2012/0290650 A1 | 11/2012 | Montuno et al. | |
| 2013/0007186 A1* | 1/2013 | Liu | H04L 67/1008 709/213 |
| 2013/0066908 A1 | 3/2013 | Niranjan | |
| 2013/0262578 A1* | 10/2013 | Kim | H04M 1/2745 709/204 |
| 2013/0304857 A1* | 11/2013 | Li | H04W 8/186 709/217 |
| 2014/0010108 A1* | 1/2014 | Tavildar | H04W 8/005 370/254 |
| 2014/0149592 A1* | 5/2014 | Krishna | G06F 1/329 709/226 |
| 2014/0172979 A1* | 6/2014 | El-Beltagy | H04L 67/1046 709/204 |
| 2014/0226639 A1* | 8/2014 | Yi | H04W 74/04 370/336 |
| 2014/0257953 A1* | 9/2014 | Kaplan | G06Q 30/0214 705/14.16 |
| 2014/0274031 A1* | 9/2014 | Menendez | H04W 52/0209 455/426.1 |
| 2014/0280563 A1* | 9/2014 | El-Beltagy | H04L 67/1068 709/204 |
| 2015/0072713 A1* | 3/2015 | Zhu | H04W 4/023 455/456.3 |
| 2015/0131518 A1* | 5/2015 | Nielsen | H04L 67/18 370/312 |
| 2015/0282115 A1* | 10/2015 | Pitt | H04W 64/006 455/456.1 |
| 2016/0007184 A1* | 1/2016 | Kulikov | G01S 5/0252 455/41.2 |
| 2016/0119768 A1* | 4/2016 | Sharma | H04W 8/005 455/435.1 |
| 2016/0255142 A1 | 9/2016 | Hunt et al. | |

FOREIGN PATENT DOCUMENTS

| | | |
|---|---|---|
| KR | 1020140125079 | 10/2014 |
| WO | WO2013106716 A1 | 7/2013 |

OTHER PUBLICATIONS

PCT Search Report and Written Opinion dated May 25, 2016 for PCT application No. PCT/US2016/019623, 12 pages.

Peterson, Ryan S., "Efficient Content Distribution with Managed Swarms", In Doctoral Dissertation of Cornell University, Jan. 2012, 152 pages.

Bawa et al., "Estimating Aggregates on a Peer-to-Peer Network", technical report, Stanford University, Jul. 8, 2008, 13 pages.

Filho et al., "BitTorrent-Like Protocols for Interactive Access to VoD Systems", in the European Journal of Scientific Research, vol. 58, No. 4, Aug. 2011, pp. 550-569.

Meskovic et al., "Content Delivery Architectures for Live Video Streaming: Hybrid CDN-P2P as the best option", in the Proceedings of the Fifth International Conference on Communication Theory, Reliability, and Quality of Service, Apr. 4, 2012, 7 pages.

"Non Final Office Action Issued in U.S. Appl. No. 15/052,675", dated Jun. 12, 2018, 30 Pages.

"International Search Report and Written Opinion Issued in PCT Application No. PCT/US2016/019615", dated Aug. 1, 2016, 17 Pages.

"Invitation to Pay Additional Fees Issued in PCT Application No. PCT/US2016/019615", dated May 24, 2016, 06 Pages.

* cited by examiner

CO-LOCATING PEER DEVICES FOR PEER MATCHING

This application claims the benefit of and priority to U.S. Provisional Application No. 62/121,413, filed Feb. 26, 2015, the entire contents of which are incorporated herein by reference.

BACKGROUND

Digital content, such as an operating system update or a video game, is often available for download over a network connection from a digital content provider, thereby eliminating the need for a user to install the digital content on a computing device. The digital content can include a large amount of data, and therefore, downloading the digital content can potentially take a significant amount of time and/or can consume a significant amount of resources (e.g., networking resources, processing resources, memory resources, etc.). The amount of time taken and the amount of resources consumed in association with downloading the digital content from the digital content provider is exacerbated when numerous computing devices attempt to download the same digital content at or around the same time (e.g., at or around a time when the digital content is initially released or updated). Consequently, peer matching systems are implemented so computing devices can download digital content from other peer computing devices rather than from a digital content provider.

In conventional peer matching systems, peer devices contact a specific instance of a central service, advertising that they are willing to seed or share digital content with other peer devices. Consequently, peer devices interested in downloading the same digital content must contact the same specific instance of a central service, and ask for a set of peer devices to which they can connect to download the requested digital content.

However, conventional peer matching systems have several limitations. That is, a specific instance of the central service has limited resources including: limited memory resources to store peer matching information associated with computing devices that have initiated contact with the specific instance of the central service, limited processing resources to process peer matching information associated with computing devices that have initiated contact with the specific instance of the central service, and limited networking resources to receive and transmit peer matching information from and to computing devices that have initiated contact with the specific instance of the central service. Consequently, a specific instance of the central service can only handle a limited number of requests for registering peer devices during a particular time interval. When this limited number is reached, the specific instance of the central service becomes overloaded and peer matching performance implemented by the specific instance of the central service is severely reduced (e.g., requests may be turned away). Moreover, a specific instance of the central service can even fail or go offline due to the overload or some other reason, and therefore, the computing devices that contacted the specific instance of the central service can be lost (e.g., their availability for peer matching may not be recognized).

SUMMARY

The techniques and systems described herein implement an improved peer matching service to address the resource limitations of a specific instance of the central service described above. The peer matching service is configured to coordinate peer matching requests across a plurality of peer matching nodes so that resource consumption can be spread out and resource limitations are not exceeded. Consequently, the possibility of performance issues related to peer matching is reduced. In various examples, a peer matching node, as used herein, can correspond to a specific instance of the central service described above.

Accordingly, the peer matching service defines and creates a unit for peer matching scalability. As used herein, the unit is referred to as a peer matching unit. A peer matching unit includes multiple peer matching nodes, where an individual peer matching node may be contacted by, and interact with, a number of peer devices (e.g., clients). In various examples, a peer device is configured to contact a peer matching node via the use of virtual Internet Protocol (VIP) address assigned to the peer matching unit. That is, the VIP address virtualizes access to the peer matching nodes within a peer matching unit. In addition to peer matching nodes, a peer matching unit includes a hub that is responsible for synchronizing information across the multiple different peer matching nodes within an individual peer matching unit (e.g., changes to lists of peer device identifiers requesting peer matches for a specific content identifier).

In various examples, the peer matching service described herein includes a unit controller that is configured to manage various peer matching units. For instance, the unit controller is configured to assign content identifiers to a peer matching unit so peer devices requesting peer matches for a particular content identifier can be directed to a peer matching unit to which the particular content identifier is assigned. Furthermore, the unit controller is configured to receive information indicative of a number of actual peer devices that have registered, with the peer matching nodes of the peer matching unit, for peer matching services associated with any one of various content identifiers assigned to the peer matching unit. For a given time interval, the unit controller can determine whether the number of peer devices that have registered exceeds a threshold number of peer devices, and if so, the unit controller can implement an action to scale the number of actual peer devices that have registered with the peer matching nodes of the peer matching unit (e.g., redistribute peer device registrations from one peer matching unit to another peer matching unit). In one example, the action can comprise activating an overflow peer matching unit to reduce the number of actual peer devices that have registered with the peer matching nodes of the peer matching unit. In another example, the action can comprise re-assigning one of multiple different content identifiers to another peer matching unit to reduce the actual number of peer devices that have registered with the peer matching nodes of the peer matching unit.

In various examples, the hub is configured to synchronize information across the multiple different peer matching nodes within an individual peer matching unit. Accordingly, the hub is configured to generate and maintain a list of peer identifiers corresponding to a set of peer devices that have registered with multiple peer matching nodes of the peer matching unit for peer matching services associated with a content identifier. The hub is further configured to receive, from individual peer matching nodes within the peer matching unit, information representative of changes to the list of peer identifiers corresponding to the set of peer devices that have registered with individual peer matching nodes of the peer matching unit. A change can occur, or be detected, at a particular peer matching node and a change can comprise: an addition of a new peer identifier to the list, a removal of an expired peer identifier from the list, or an update to peer metadata representative of a state of a peer device changing from a first state to a second state that is different than the first state. The hub can then combine the received information from the collective peer matching nodes and use the combined information to generate information representative of changes to the list (e.g., occurring across multiple peer matching nodes). Subsequently, the hub can provide, to the peer matching nodes within the peer matching unit, the information representative of changes to the list of peer identifiers. In various implementations, the hub is also configured to report, to the unit controller, information associated with a health status and/or a number of peer devices registered across the peer matching nodes of the peer matching unit, in case scaling of requests by the unit controller can help performance. For example, the unit controller can scale our requests across multiple peer matching units to help performance.

In various examples, an individual peer matching node is configured to maintain a version of the list of peer identifiers (e.g., a "node" version or a "local" version). The peer matching node is also configured to store, based on information received from the hub, the list of peer identifiers corresponding to a set of peer devices that have registered with the multiple peer matching nodes for peer matching services associated with the content identifier. Consequently, the peer matching node identifies changes to the list that occur at the peer matching node (e.g., occur locally). The peer matching node can then send the information representative of a first set of changes (e.g., the changes that occur at the peer matching node) to the list to the hub, and receive, from the hub, information representative of a second set of changes to the list, where the second set of changes is typically a larger set of changes that have occurred across multiple peer matching nodes within the peer matching unit. Finally, the peer matching node can update its version of the list based on the information received from the hub and provide the list of peer identifiers to peer devices that have registered with the peer matching node for peer matching services associated with the content identifier.

In various examples, peer matching node(s) and/or the hub is configured to receive, from peer devices, location information in association with requests to register the set of peer devices with the peer matching node(s) for peer matching services associated with a content identifier. Then, the peer matching node(s) and/or the hub can determine, based at least in part on the location information, that a subset of the set of peer devices is associated with co-location information indicating that peer devices in the subset are proximal to one another. The peer matching node(s) and/or the hub can provide, to individual peer devices in the subset, a list of peer identifiers for the peer matching services associated with the content identifier, the list prioritizing first peer identifiers corresponding to other co-located peer devices included in the subset over second peer identifiers corresponding to peer devices not included in the subset (e.g., peer devices that are not co-located).

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, can refer to system(s), method(s), computer-readable instructions, engine(s), module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

Figure 1:
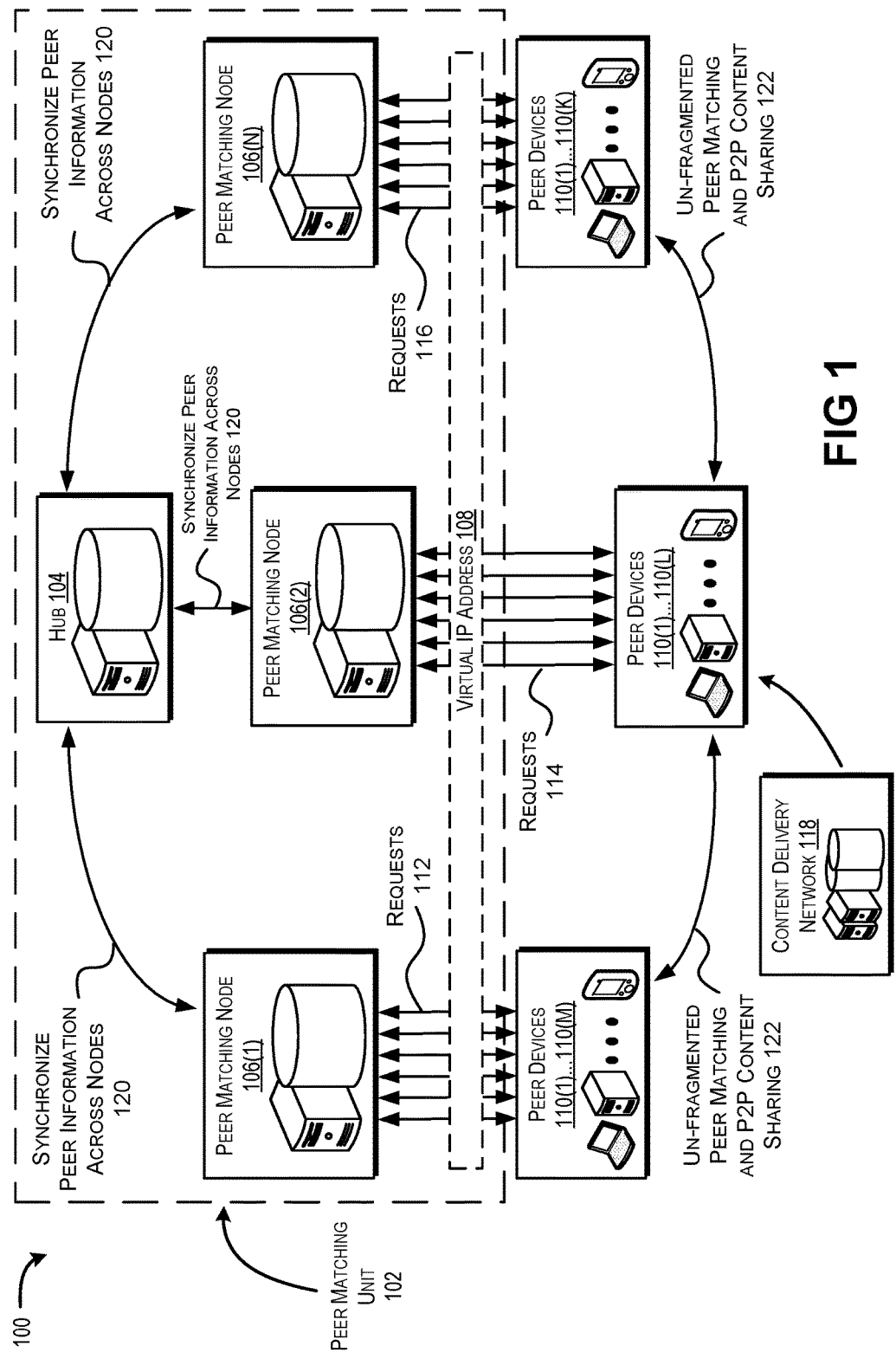
FIG. 1 is a block diagram depicting an example environment in which a peer matching unit is configured to handle peer matching requests from peer devices.

The techniques and systems described herein can be used to improve the distribution of digital content (e.g., referred to herein as "content") via the use of peer-to-peer (P2P) connections of a peer-to-peer (P2P) network rather than a peer device downloading the content directly from a digital content provider (e.g., via the use of a content delivery network (CDN)). A P2P network can be used to reduce the amount of resource consumption and the amount of time used to distribute the content to a plurality of peer devices. The content, for example, can include any digital content such as a video game or an operating system update.

In order to improve the distribution of specific content identified by a content identifier (ID), information regarding peer devices that currently have the specific content can be collected as well as information regarding peer devices that are currently interested in, or in the process of obtaining, the specific content. Therefore, peer devices associated with the same content ID can be matched and peer device identifiers (e.g., an Internet Protocol (IP) address) can be shared by a peer matching service so that the content can be downloaded via peer-to-peer (P2P) transfer in an efficient and effective manner. At any given time, a group of peer devices that are participating in, or that are available for, peer-to-peer (P2P) sharing of content associated with a particular content ID can be referred to as a swarm. A swarm is dynamic, in that an individual peer device can join or leave the swarm (e.g., in response to a user turning on and/or off the peer device, in response to a user selectively enabling and/or disabling P2P communication and sharing capabilities of the peer device, etc.).

The techniques and systems described herein implement a hierarchy of components including a unit controller, a hub, and a peer matching node, each of which comprises a device(s) with memory and processor(s), to coordinate peer matching functionality to address the resource limitations described above and to reduce the possibility of performance issues related to peer matching A hub and a plurality of peer matching nodes can be part of a peer matching unit and the unit controller is configured to manage various peer matching units and to scale peer matching requests across the various peer matching units.

Furthermore, the unit controller and/or the hub are configured to implement functionality to avoid swarm fragmentation. As described above, a swarm is a group of matched peer devices that are participating in, or that are available for, P2P sharing of content associated with a particular content ID during a given time interval. In conventional peer matching systems, swarm fragmentation results when peer requests associated with the same content ID are split across multiple different instances of a central service (e.g., due to resource limitations). Consequently, an ecosystem of a larger group of peer devices (e.g., the whole swarm) sharing a piece of content is typically segmented into smaller "fragmented" groups, thereby reducing the efficiency of peer transfers. For instance, by reducing a number of available peer devices, swarm fragmentation reduces the possibility that the best peer matches for a particular peer device can be utilized (e.g., peer devices geographically located close to one another may consume less networking resources to transfer content via a P2P connection).

Therefore, the unit controller and/or the hub implement a peer matching service that synchronizes peer matching requests across multiple different peer matching nodes thereby eliminating swarm fragmentation. Moreover, the unit controller and/or the hub are configured to scale a number of requests to avoid swarm fragmentation (e.g., scale the requests by adding a peer matching unit, etc.).

In various examples, peer devices are determined to be co-located peer devices based on location information and a list that prioritizes co-located peer devices can be generated and provided.

FIG. 1 is a block diagram depicting an example environment 100 in which a peer matching unit 102 is created by an entity implementing a peer matching service. The peer matching unit 102 is configured to handle peer matching requests (e.g., requests may also be referred to as "transactions") from peer devices. The peer matching unit 102 includes a hub 104 and a plurality of peer matching nodes 106(1) . . . 106(N), where N is a positive integer number (e.g., two, five, eight, ten, fifteen, etc.). The peer matching nodes 106(1) . . . 106(N) are individually configured to receive, via a Virtual Internet Protocol (VIP) address 108, requests from peer devices 110. Accordingly, FIG. 1 illustrates that peer matching node 106(1) receives (e.g., via the VIP address 108) requests 112 from a first number of peer devices 110(1) . . . 110(M), that peer matching node 106(2) receives (e.g., via the VIP address 108) requests 114 from a second number of peer devices 110(1) . . . 110(L), and that peer matching node 106(N) receives (e.g., via the VIP address 108) requests 116 from a third number of peer devices 110(1) . . . 110(K), where the numbers M, L, and/or K are positive integer numbers that can be the same or different (e.g., thousands of peer devices, hundreds of thousands of peer devices, etc.). The peer devices illustrated in FIG. 1 may collectively be referenced by 110 further in this disclosure. The collective peer devices 110 may be part of a single swarm (e.g., if the peer matching unit 102 is only configured to implement peer matching services for a single content ID), or the collective peer devices 110 may be part of multiple swarms (e.g., if the peer matching unit 102 is configured to implement peer matching services for multiple different content IDs).

The peer matching unit 102 is created and defined to be a scalable and an organized unit to control peer matching for one or more content IDs. Thus, in some instances, peer matching services for a specific content ID can be isolated to a peer matching unit 102. In various examples, a number of peer matching nodes 106(1) . . . 106(N) defined for, and configured within, the peer matching unit 102 is based on a number of requests expected, or predicted, to be received from peer devices (e.g., peer devices 110). The expected number of requests can be for a particular time interval (e.g., a minute, fifteen minutes, thirty minutes, an hour, twelve hours, twenty-four hours, and so forth). Accordingly, the expected number of requests is determined based on considerations of the individual content IDs assigned to the peer matching unit 102 for peer matching purposes (e.g., how many peer devices will be interested in obtaining a particular operating system update). The number of peer matching nodes 106(1) . . . 106(N) defined for, and configured within, the peer matching unit 102 can also be based on an optimum operating capacity of an individual peer matching node. For instance, if the total operating capacity that an individual peer matching node 106(1) . . . 106(N) can handle, during a given time interval and before resource limitations degrade performance, is one hundred thousand requests, then the optimum operating capacity can be set to a threshold percentage such as 50% of the total operating capacity (e.g., fifty thousand requests) or 80% of the total operating capacity (e.g., eighty thousand requests). This creates and enables some room for the peer matching nodes 106(1) . . . 106(N) of a peer matching unit 102 to handle a larger number of requests than what was expected or predicted. In a specific example, if an expected number of requests (e.g., per a pre-defined time interval) for one or more particular content IDs assigned to a peer matching unit 102 is eight hundred thousand requests, and the optimum operating capacity of an individual node is 80% (e.g., eighty thousand requests) of a total operating capacity (e.g., one hundred thousand requests), then the peer matching unit 102 can be created to include ten peer matching nodes (N=10=800,000/80,000).

In an event the number of requests received by the peer matching nodes configured within the peer matching unit exceeds a maximum number associated with performance degradation, another peer matching unit can be added (e.g., an overflow peer matching unit that is on standby) and a content ID can be re-assigned from the current peer matching unit to the other peer matching unit or requests for a content ID can be split between two peer matching units. In some instances, a peer matching unit can increase capacity for handling requests by increasing the number of nodes within the peer matching unit (e.g., adding a peer matching node).

Consequently, the techniques and systems described herein address resource limitations and swarm fragmentation by defining and creating a scalable peer matching unit 102 that includes a number of peer matching nodes 106(1) . . . 106(N). Requests received within the peer matching unit 102 can be synchronized across the plurality of nodes 106(1) . . . 106(N) (e.g., a swarm is not dependent on an individual peer matching node).

As described above, a swarm is established around specific content (e.g., a digital content item), including but not limited to a video game or a portion of a video game, a movie or a portion of a movie, a television program or a portion of a television program, a song or a portion of a song, an operating system or an update to an operating system, an electronic mail service update, a downloadable application ("app") or an update to an app already downloaded, and so forth. An individual peer matching node 106(1), 106(2), 106(N) collects and maintains information about the various peer devices that request to register for peer matching associated with specific content (e.g., as identified by a content ID). For example, the information can indicate whether a peer device is participating in the P2P sharing or P2P transfer of content. Additionally, peer matching nodes 106(1) . . . 106(N) individually can help their respective peer devices find other peer devices that have, or desire, the same content. For instance, in response to the requests, the peer matching nodes 106(1) . . . 106(N) can share a list of peer identifiers with their respective peer devices so that the peer devices can, themselves, initiate P2P connections and P2P sharing of content rather than obtaining the content via a digital content store supported by a content delivery network (CDN) 118. In many cases, it can be more cost-effective for a digital content provider to enable and/or allow peers to download content from each other rather than from a CDN 118. However, in some implementations, the CDN 118 can supplement the downloading of content if the content cannot be obtained via P2P transfer resulting from peer matching. In various implementations, a peer matching node 106(1) . . . 106(N) may be referred to as a coordinator or a tracker.

In a P2P network, peer devices have access to a P2P file sharing protocol and can use that protocol to obtain particular content from other peer devices via a P2P connection (e.g., via the use of peer IDs such as IP addresses). A peer device can have one or more current connections to other peer devices using the protocol. Thus, a peer device can join or leave a P2P network if it forms or drops connections to other peer devices. A P2P connection does not have to be actively used for content distribution although the P2P connection is suitable for doing so using the particular protocol. In various implementations, the P2P connection can use network encoding. Moreover, a P2P connection can either be a one-way or a two-way connection. In various implementations, it is possible for a given peer device to be a member of more than one P2P network at a given time.

A peer device is configured to receive, process, and/or present content. Thus, a peer device can include, but is not limited to, any one of a variety of devices, including a portable device or a stationary device. For instance, a peer device can comprise a smart phone, a mobile phone, a personal digital assistant (PDA), an electronic book device, a laptop computer, a desktop computer, a tablet computer, a portable computer, a gaming console, a personal media player, a wearable device (e.g., a head-mounted display, a health monitoring device, etc.), a server, or any other electronic device. Moreover, a peer device can be associated with a corresponding user. In some instances, more than one peer device may be associated with a same user.

The hub 104 is configured to synchronize peer IDs, associated with a particular content ID, across the plurality of peer matching nodes 106(1) . . . 106(N). Accordingly, the hub 104 generates and/or maintains, per each content ID assigned to the peer matching unit 102, a list of peer IDs corresponding to a set of peer devices that have registered with the peer matching nodes 106(1) . . . 106(N). The list is based on combining information representative of peer changes that occur at individual peer matching nodes (e.g., a new peer ID that has registered, an expired peer ID that has been removed, an update to peer metadata that causes a state change for a peer ID, etc.). For example, in a scenario where the peer devices 110 in FIG. 1 are all part of the same swarm, peer matching node 106(1) maintains and reports information associated with changes for peer devices 110(1) . . . 110(M), peer matching node 106(2) maintains and reports information associated with changes for peer devices 110(1) . . . 110(L), and peer matching node 106(N) maintains and reports information associated with changes for peer devices 110(1) . . . 110(K). The hub 104 then generates, maintains, and updates the list based on the information reported by the peer matching nodes 106(1) . . . 106(N). Consequently, FIG. 1 illustrates that the hub 104 synchronizes peer information across the multiple peer matching nodes 106(1) . . . 106(N), as referenced by 120. That is, the hub 104 provides an updated list within which: new peer devices recently registered across all the peer matching nodes 106(1) . . . 106(N) have been added, expired peer devices that are no longer registered across all the peer matching nodes 106(1) . . . 106(N) have been removed, and/or peer metadata is updated based on state changes to peer devices registered across all the peer matching nodes 106(1) . . . 106(N). Via the synchronization, any peer matching node 106(1), 106(2), 106(N) in the peer matching unit 102, and by proxy, any peer device registered with any peer matching node, can be provided with a view into other peer IDs (e.g., as well as peer metadata) that have registered with other peer matching nodes for peer matching to obtain the same content.

Consequently, the peer devices 110 are able to implement un-fragmented peer matching and P2P content sharing, as referenced by 122, even though not all the peer devices 110 initially registered with the same peer matching node (e.g., the requests are spread across multiple peer matching nodes 106(1) . . . 106(N)). Stated another way, the requests from peer devices that belong to the same swarm can be "fragmented" when they are initially received at multiple different peer matching nodes (e.g., different versions of the list stored locally at the respective peer matching nodes can be different based on node-specific changes that have recently occurred), but via the synchronization of peer information (e.g., peer IDs and metadata) across nodes 120, the actual list provided to the peer devices in response to the requests is not fragmented, but rather synchronized. Thus, a P2P connection subsequently established by a peer device with a matched peer device is not limited by swarm fragmentation.

In various examples, the hub 104 and the peer matching nodes 106(1) . . . 106(N) can be implemented as network resources and can include server devices or other devices that comprise a datacenter, a server farm, or other cloudconfigured resources that communicate over network(s). To this end, network(s) can comprise a wide area network (WAN), a local area network (LAN), a personal area network (PAN), a network specific to a datacenter (e.g., an Intranet, a storage area network (SAN)), a mobile telephone network (MTN), etc. A network can also comprise switches that connect various devices to routers and/or other devices that can act as bridges between data networks. Communications between devices can utilize any sort of communication protocol known in the art for sending and receiving information and/or messages, such as the Transmission Control Protocol/Internet Protocol (TCP/IP) and/or the User Datagram Protocol (UDP).

Figure 2:
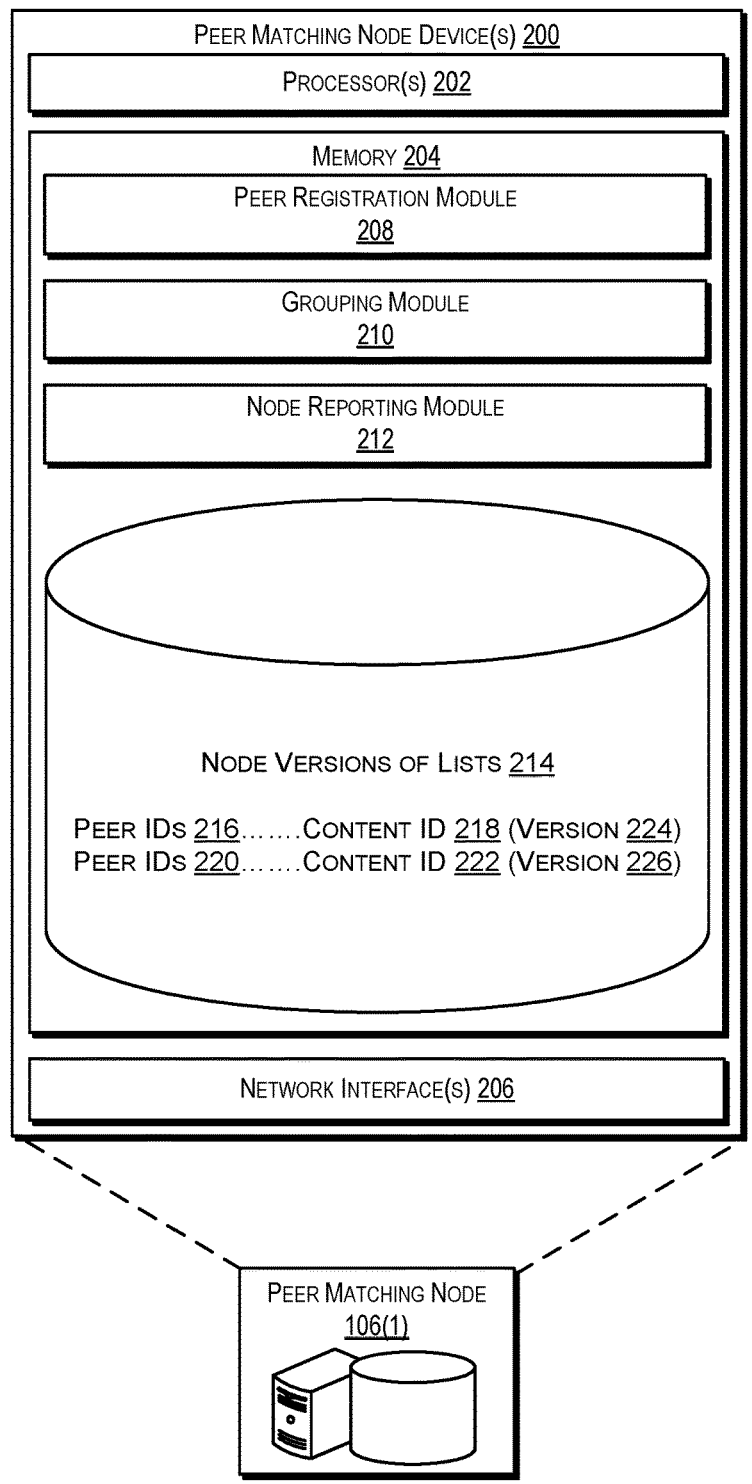
FIG. 2 is a block diagram of a peer matching node device depicting additional details of a peer matching node (e.g., a peer matching node illustrated in FIG. 1).

FIG. 2 is a block diagram of a peer matching node device 200 depicting additional details of a peer matching node (e.g., a peer matching node 106(1) illustrated in FIG. 1 can comprise the peer matching node device 200). The peer matching node device 200 can include one or more processor(s) 202 and memory 204, as well as network interface(s) 206 so that the peer matching node device 200 can communicate with peer devices 110 and the hub 104. The processor(s) 202 can be a single processing unit or a number of units, each of which could include multiple different processing units. The processor(s) 202 can include a microprocessor, a microcomputer, a microcontroller, a digital signal processor, a central processing unit (CPU), a graphics processing unit (GPU), etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) 202 can be configured to fetch and execute computer-readable instructions stored in the memory 204.

The memory 204 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random access memory (RAM), read only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The memory 204 can also include an operating system configured to manage hardware and services within and coupled to the peer matching node device 200 for the benefit of other components and other devices. By way of example, the memory 204 can include a peer registration module 208, a grouping module 210, and a node reporting module 212, each of which is further described herein. As used herein, the term "module" is intended to represent example divisions of executable instructions for purposes of discussion, and is not intended to represent any type of requirement or required method, manner or organization. Accordingly, while various "modules" are described, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules can be implemented in whole or in part by hardware (e.g., a specialized processing unit, etc.) to execute the described functions.

In various implementations, the memory 204 can also include a datastore that maintains lists 214. The lists 214 stored by the peer matching node device 200 are versions of lists synchronized and updated, over time, by the hub 104. Thus, the lists 214 may be referred to as "node" versions because they are stored locally in association with a particular peer matching node. The peer registration module 208 is configured to receive the requests (e.g., requests 112) from peer devices (e.g., peer devices 110(1) . . . 110(M)) that have contacted a particular peer matching node (e.g., peer matching node 106(1)). In various examples, the requests are received via a VIP address 108 and the requests are a subset of a larger set of requests that are distributed amongst the peer matching nodes 106(1) . . . 106(N) of a peer matching unit 102 (e.g., evenly distributed for load balancing, randomly distributed, etc.). An individual request received from a peer device can include a peer ID (e.g., an IP address or other identifier that can be used for peer matching), a content ID associated with content the peer device desires to download via P2P sharing and P2P transfer (e.g., an operating system update), and peer information that is maintained and stored for peer matching purposes (e.g., metadata such as a type of P2P protocol that a peer device is using or capable of using, a status associated with the amount of the desired content already downloaded, etc.). In some instances, the peer device is configured to issue the request based on an automated check-in to the peer matching service (e.g., a periodic check-in, a triggered check-in based on a specific action such as a boot sequence, etc.). In other instances, the peer device is configured to issue the request in response to a user instruction to retrieve the content.

Once the peer registration module 208 has recognized the peer device, and registered the peer ID and the content ID (e.g., store information associated with the peer device), the grouping module 210 is configured to map the peer device to a particular group of peer devices associated with the same content ID (e.g., peer devices that desire to download the same content, peer devices that contain at least some of the content and are available for peer-to-peer transfer, etc.). Stated another way, the grouping module 210 implements a bucketing mechanism and drops peer IDs into various buckets based on the content ID requested. Accordingly, the grouping module 210 is configured to add, based on the mapping, a peer ID to a list 214. FIG. 2 illustrates that the grouping module 210 has generated and maintains a first list of peer IDS 216 for a first content ID 218 (e.g., an operating system update) and has generated and maintains a second list of peer IDS 220 for a second content ID 222 (e.g., a new video game). While FIG. 2 illustrates two content IDs, it is understood in the context of this document, that a peer matching node can perform peer matching services for any number of content IDs (e.g., one, three, five, ten, twenty, one hundred, etc.) assigned to a peer matching unit within which the peer matching node is configured.

The node reporting module 212 is configured to report information associated with the lists 214 to the hub 104. The reporting may be implemented periodically for a given time period (e.g., every fifteen minutes, every hour, every five hours, every twelve hours, etc.) or the reporting may be implemented in response to a reporting instruction received from the hub 104. In some instances, the reporting is implemented once a threshold number of changes to a list 214 occurs at a particular peer matching node (e.g., a certain number of new peer IDs are added to the list, a certain number of expired peer IDs are removed from the list, or a combination of both). Accordingly, the node reporting module 212 is configured to identify changes to a list (e.g., additions of new peer IDS, removals of expired peer IDs, updates to metadata for a peer ID, etc.), to generate information representative of the changes to the list, and to send the information to the hub 104. For example, the information can include only the peer IDs that have been added to the list since the last report (e.g., new peer IDs that have been added during the most recent time interval). In another example, the information can include only the peer IDs that have been removed from the list since the last report (e.g., expired peer IDs that have been removed during the most recent time interval). In yet another example, the information can include updates to peer metadata that have occurred since the last report, which indicate a change in state of a peer (e.g., a change in a type of P2P protocol being used by a peer device, a change in an IP address being used by a peer device, a change to the amount of data associated with the content ID already obtained, etc.). In some instances, the information can include a combination of the new peer IDs that have been added to the list since the last report, the expired peer IDs that have been removed from the list since the last report, and the updates to the peer metadata. As an alternative, the information can include the full list of peer IDs in the list (e.g., with information that distinguishes and/or identifies new peer IDs, expired peer IDs and/or peer IDs with updated metadata).

The node reporting module 212 is subsequently configured to receive, from the hub 104, information related to additional changes to the lists 214. In various examples, the information received is representative of changes (e.g., additions of new peer IDs, removal of expired peer IDs, etc.) occurring at the plurality of peer matching nodes 106(1) . . . 106(N) within the peer matching unit 102.

Consequently, the grouping module 210 is configured to update the lists 214 based on the information received from the hub 104. Moreover, the peer registration module 208 is configured to provide the d list of peer IDs to the peer devices that have contacted the particular peer matching node requesting peer matches.

In various implementations, the information received from the hub 104 related to the changes to a list 214 can include a version number associated with an update. Version numbers can be sequential, and therefore, can represent deltas (e.g., differences) between a previous list and a current (e.g., new and updated) list (e.g., from one reporting period to the next). Moreover, the version numbers can be used by the peer matching node and the hub to request and receive an update that was missed because the peer matching node was unavailable to receive the update (e.g., the peer matching node failed, the peer matching node was offline due to a lost connection, etc.). For instance, upon coming back online, the peer matching node can request that the hub 104 check to determine if the peer matching node has a current and most recent version of a list. The peer matching node reports its last version number of a list to the hub (e.g., the last version number known by the peer matching node), and the hub, in response can determine that the last version number known to the peer matching node is not the current version number of the list maintained by the hub. The hub can then send, to the peer matching node, the information associated with changes to the list for any versions that were missed so that the version of the list stored locally by the peer matching node can be returned, or brought, to the most recent state. Accordingly, FIG. 2 illustrates that the first list of peer IDs 216 associated with the first content ID 218 is associated with version number 224, while the second list of peer IDs 220 associated with the second content ID 222 is associated with version number 226.

The node reporting module 212 is also configured to report, to the hub 104, information related to the health of the peer matching node. For example, the information related to the health can include a number of requests received from peer devices (e.g., per a time interval). In another example, the information related to the health can include an amount of available resources (e.g., processing resources, memory resources, networking resources, etc.). The amount of available resources can be determined with respect to the optimum operating capacity described above, or alternatively, the amount of available resources can be determined with respect to a total operating capacity associated with performance degradation, as described above.

Figure 3:
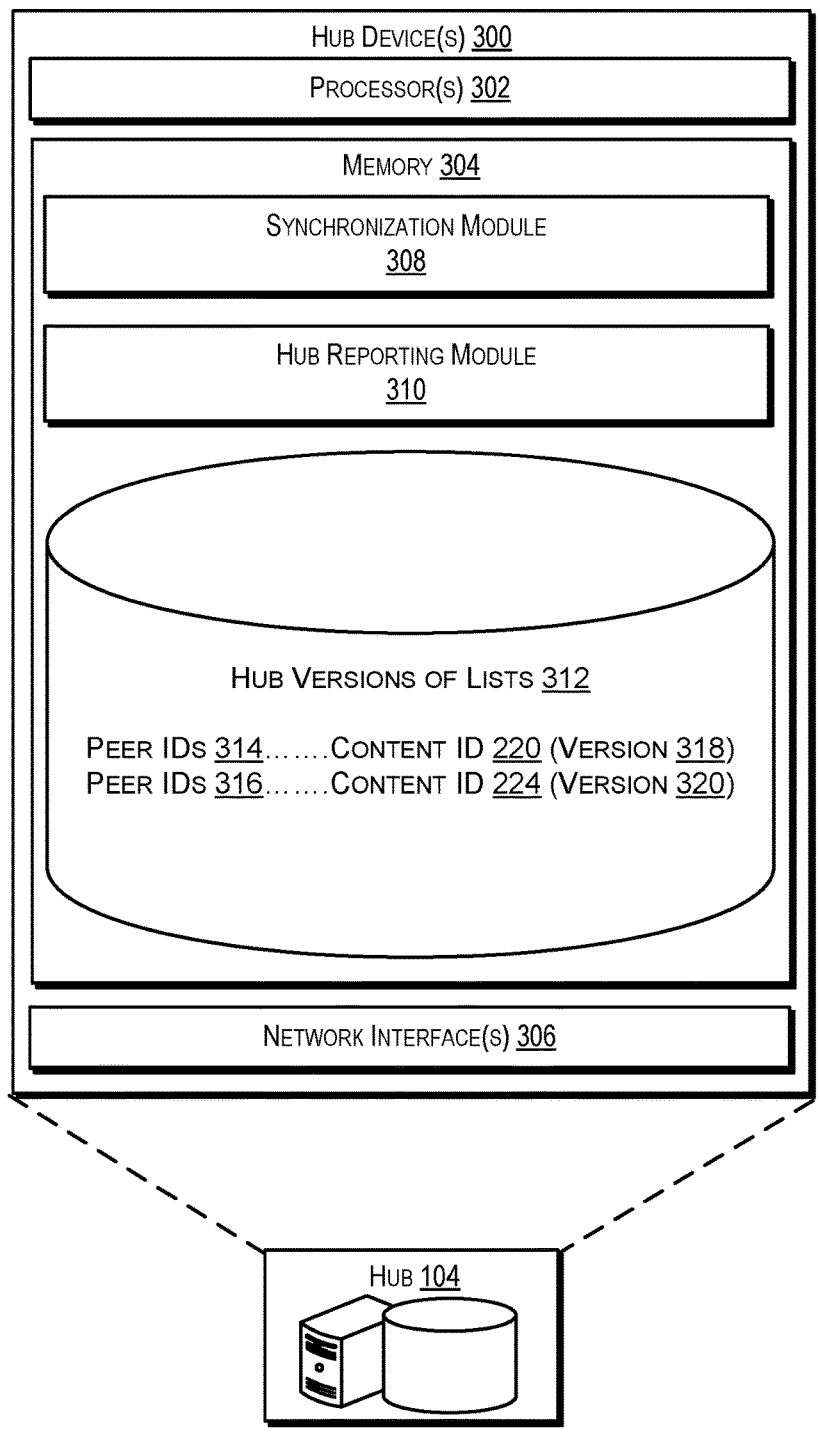
FIG. 3 is a block diagram of a hub device depicting additional details of a hub (e.g., the hub illustrated in FIG. 1).

FIG. 3 is a block diagram of a hub device 300 depicting additional details of a hub (e.g., the hub 104 illustrated in FIG. 1 can comprise the hub device 300). The hub device 300 also includes one or more processor(s) 302 and memory 304, as well as network interface(s) 306 so that the hub device 300 can communicate with the peer matching nodes (e.g., peer matching nodes 106(1) . . . 106(N) in FIG. 1) and a unit controller (as further explained herein with respect to FIGS. 7 and 8). The processor(s) 302 and/or the memory 304 can be one of the example processor(s) 202 and/or example memory 204 described above with respect to FIG. 2.

The memory 304 includes a synchronization module 308, a hub reporting module 310, and a datastore that maintains lists 312.

The synchronization module 308 is configured to receive, from an individual peer matching node, information associated with changes to the lists 312, where the changes received from an individual peer matching node are specific to that particular peer matching node. The period for receiving the information (e.g., the reporting period) may be periodic (e.g., every fifteen minutes, every hour, every five hours, every twelve hours, etc.) or the synchronization module 308 can issue an instruction for the peer matching nodes 106(1) . . . 106(N) to report. The synchronization module 308 can then, for each content ID, combine the received information and generate information representative of a larger group of changes to the lists 312 (e.g., peer IDs that have been added across multiple peer matching nodes since a previous version, peer IDs that have been removed across multiple peer matching nodes since the previous version, etc.).

Accordingly, FIG. 3 illustrates that the datastore maintains a first list of peer IDs 314 for the first content ID 220 (e.g., the operating system update from FIG. 2) and a second list of peer IDs 316 for the second content ID 224 (e.g., the new video game from FIG. 2). Moreover, the first list of peer IDs 314 associated with the first content ID 220 is associated with version number 318 assigned by the synchronization module 308, while the second list of peer IDs 316 associated with the second content ID 224 is associated with version number 320 assigned by the synchronization module 308. In some instances, the peer IDs 314 may be the same as peer IDs 216 (e.g., if the peer matching node has the most recent state or version number 224 is equivalent to version number 318 and no further changes have occurred at the peer matching node), and/or the peer IDs 316 may be the same as peer IDs 220 (e.g., if the peer matching node has the most recent state or version number 226 is equivalent to version number 320 and no further changes have occurred at the peer matching node). However, in other cases, the lists may be different (e.g., if changes have occurred locally at a peer matching node, if a peer matching node missed an update to a synchronized list). As described above, the version numbers can be used to subsequently provide updates that were previously missed by a peer matching node.

Figure 7:
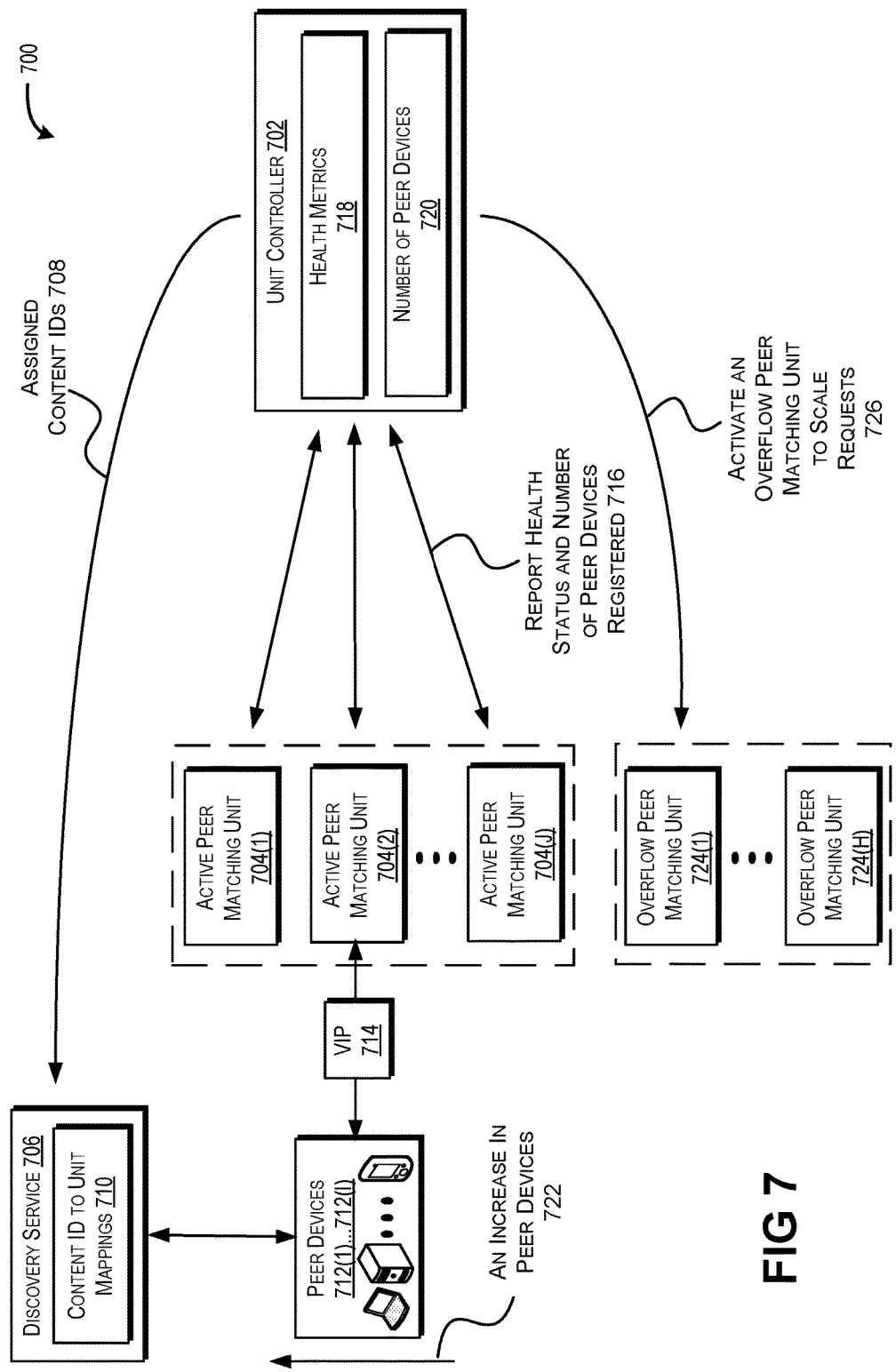
FIG. 7 is a block diagram depicting an example environment in which a unit controller is configured to manage peer matching units and scale requests amongst the peer matching units.
Figure 8:
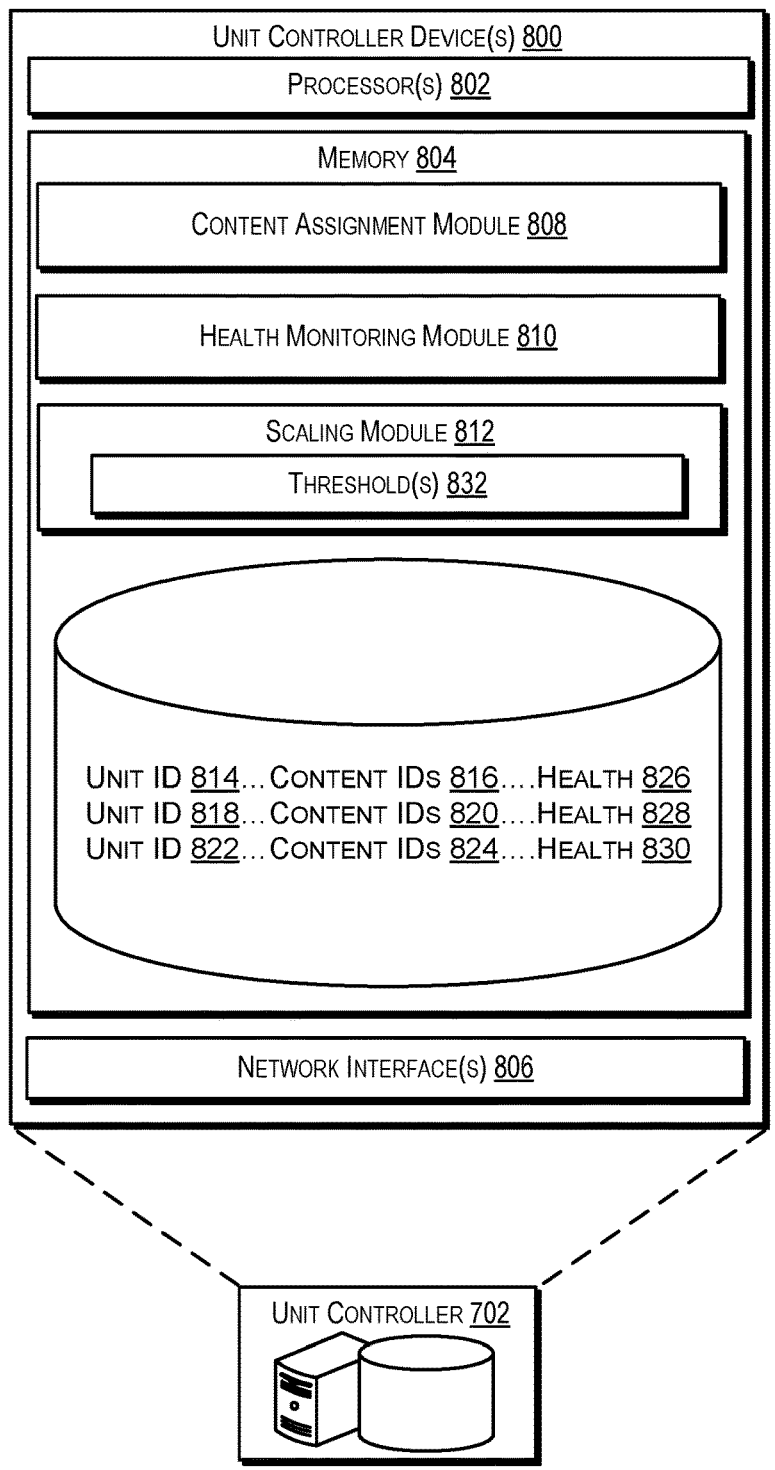
FIG. 8 is a block diagram of a unit controller device depicting additional details of a unit controller (e.g., the unit controller illustrated in FIG. 7).

The hub reporting module 310 is configured to report, to a unit controller as further discussed herein with respect to FIGS. 7 and 8, information related to the health of the peer matching unit 102 (e.g., a collective health based on the health information reported by the individual peer matching nodes 106(1) . . . 106(N)). For example, the information related to the health of the peer matching unit can include a total number of requests received from the collective group of peer devices 110 (e.g., per a time interval). In another example, the information related to the health can include an amount of available resources for the collective group of peer matching nodes 106(1) . . . 106N) (e.g., processing resources, memory resources, networking resources, etc.).

FIGS. 4-6, 9, and 11 individually illustrate an example process for employing the techniques described herein. The example processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, configure a device or a system to perform the recited operations. Generally, computer-executable instructions include routines, programs, objects, components, data structures, and the like that perform particular functions. The order in which the operations are described is not intended to be construed as a limitation, and any number of the described operations can be combined in any order and/or in parallel to implement the process. Further, any of the individual operations can be omitted.

Figure 4:
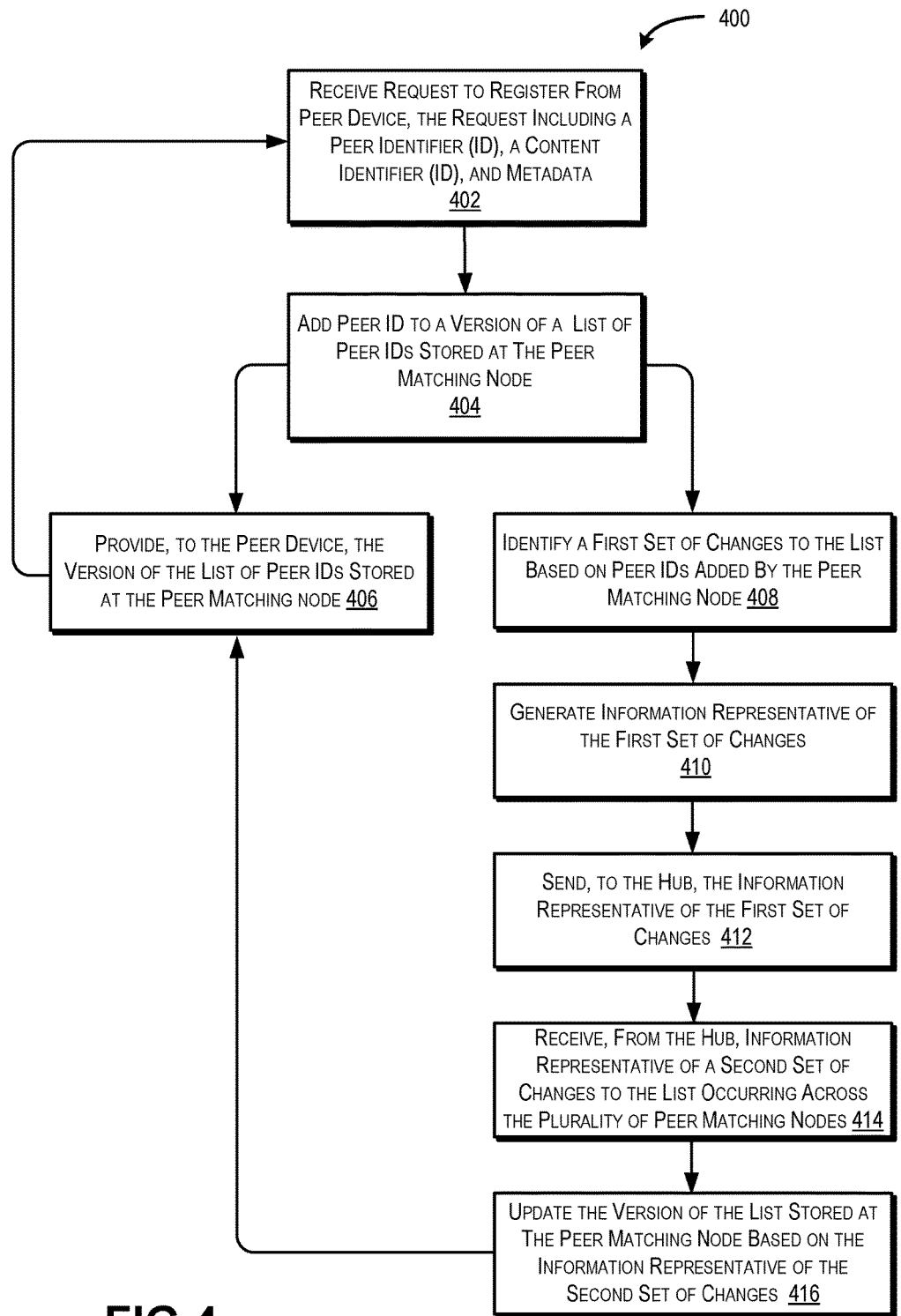
FIG. 4 is a flow diagram of an example process, implemented at an individual peer matching node, to maintain and update a list of peer identifiers based on requests received, and to provide the list of peer identifiers for peer matching purposes.

FIG. 4 is a flow diagram of an example process 400, implemented at an individual peer matching node (e.g., peer matching node 106(1)), to maintain and update a list of peer identifiers based on requests received, and to provide the list of peer identifiers for peer matching purposes. The example process 400 can be implemented in association with various elements illustrated in FIGS. 1-3.

At 402, a request to register for peer matching services is received from a peer device. The request can include a peer ID associated with a peer device (e.g., an IP address or another identifier, etc.), a content ID associated with the content the peer device desires to obtain, and peer metadata.

At 404, the peer ID is added to a version of a list of peer IDs that is stored at the peer matching node.

At 406, the version of the list of peer IDs is provided to the peer device. As described above, the list of peer IDs includes peer IDs of peer devices that registered with other peer matching nodes within the peer matching unit. Via the synchronization performed by the hub, resources consumed for peer matching can be scaled across multiple peer matching nodes, yet swarm fragmentation is avoided. Consequently, any peer matching node 106(1), 106(2), 106(N) in the peer matching unit 102, and by proxy, any peer device (e.g., all peer devices 110 in a swarm) registered with any peer matching node 106(1), 106(2), 106(N), can be provided with a view into other peer IDs that have registered with other peer matching nodes for peer matching to obtain the same content.

Operations 402, 404, and 406 can be repeated for each request received from a peer device as shown by the arrow that connects operation 406 to operation 402.

In addition to providing the list in response to receiving a request, a peer matching node is configured to continually communicate updates to the list to the hub so the hub can continually update its version of the list based on collective changes that occur across a plurality of peer matching nodes and return an updated list to the peer matching node.

Thus, in various implementations, at 408, a first set of changes to the list based on peer IDs added by a particular peer matching node can be identified (via performance of operation 404). The identification operation can occur based on a defined time period (e.g., every five minutes, every fifteen minutes, every hour, every four hours, every twelve hours, etc.), or the identification operation can be triggered (e.g., based on a threshold number of changes being reached, in response to receiving an instruction from the hub, etc.).

At 410, information representative of the first set of changes to the list can be generated. For example, the information can include the peer IDs that have been added to the list since the last report and/or update (e.g., the last update to the list sent from the peer matching node to the hub or the last update to the list received from the hub). In yet another example, the information can include the full list of peer IDs in the list (e.g., with information that distinguishes and/or identifies new peer IDs).

At 412, the information representative of the first set of changes to the list is sent to the hub, so that the hub can combine the changes that occur across a plurality of peer matching nodes (e.g., update the list and provide the updated list so changes are synchronized across all the peer matching nodes in the peer matching unit).

At 414, information representative of a second set of changes to the list is received from the hub. The second set of changes occur across multiple peer matching nodes, and therefore, the second set of changes is typically larger than the first set of changes that are specific to an individual peer matching node.

At 416, the version of the list stored locally at the peer matching node is updated based on the information representative of the second set of changes.

In various implementations, once the list is updated, the peer matching node can be configured to return to operation 406, where it sends the updated list to peer devices (e.g., newly registered peer devices and/or peer devices that may have already received a previous version of the list prior to the update to the list).

Figure 5:
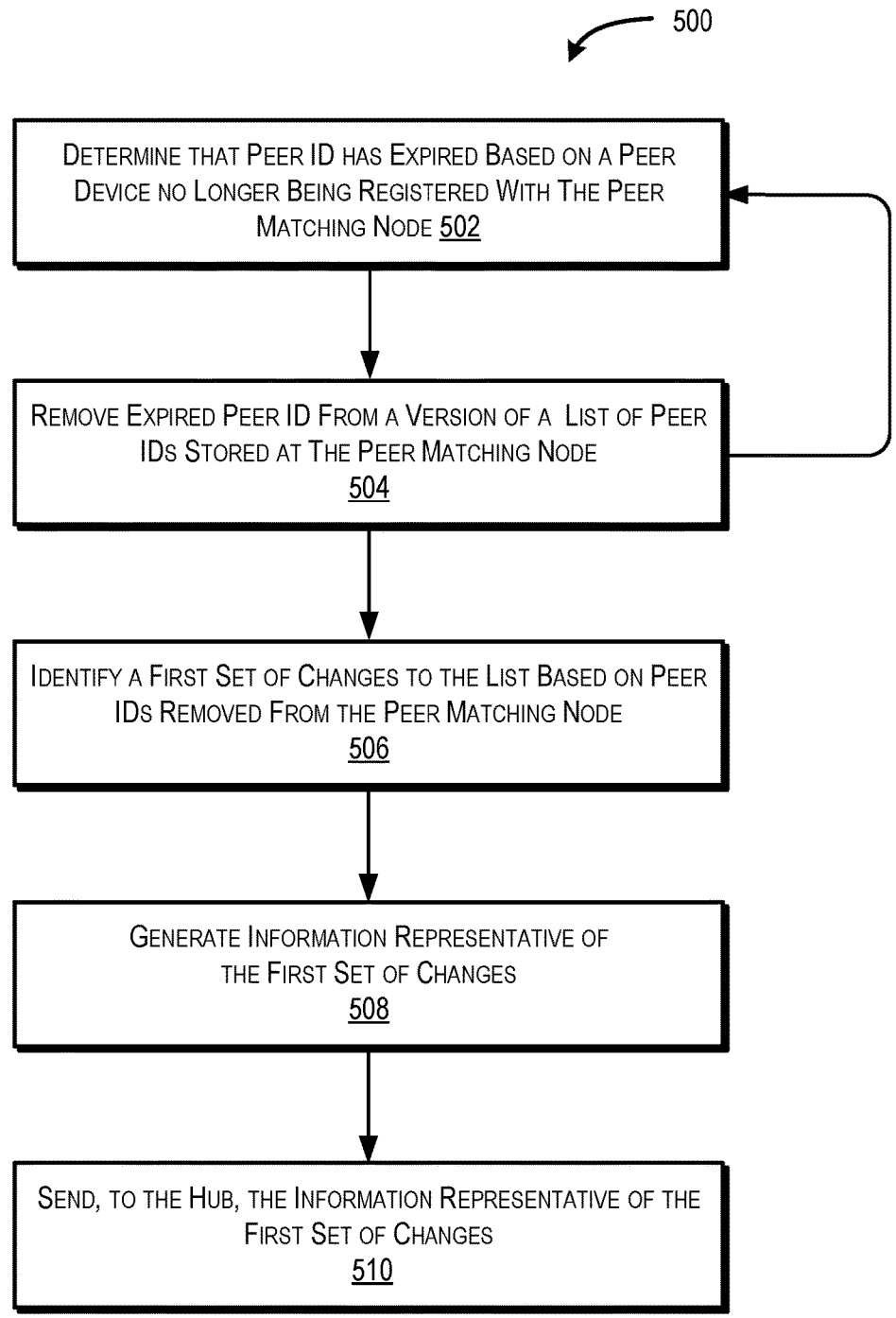
FIG. 5 is a flow diagram of another example process, implemented at an individual peer matching node, to maintain and update a list of peer identifiers based on requests received, and to provide the list of peer identifiers for peer matching purposes.

FIG. 5 is a flow diagram of another example process 500, implemented at an individual peer matching node (e.g., peer matching node 106(1)), to maintain and update a list of peer identifiers based on requests received, and to provide the list of peer identifiers for peer matching purposes. The example process 500 can be implemented in association with various elements illustrated in FIGS. 1-3.

At 502, a peer ID that has expired is determined based on a peer device no longer being registered with the peer matching node (e.g., the peer device is no longer recognized as being available for P2P sharing or P2P transfer of particular content).

At 504, the expired peer ID is removed from the list. Operations 502 and 504 can be repeated for a number of expired peer devices, as shown by the arrow that connects operation 504 back to operation 502.

At 506, a first set of changes to the list can be identified based on peer IDs that have been removed from a particular peer matching node. As described above, in one example, the identification operation occurs based on a defined time period (e.g., every five minutes, every fifteen minutes, every hour, every four hours, every twelve hours, etc.). In an alternative example, the identification operation can be triggered based on a threshold number of changes being reached, or in response to receiving an instruction from the hub.

At 508, information representative of the first set of changes to the list can be generated. For example, the information can include the peer IDs that have been removed from the list since the last report. In yet another example, the information can include the full list of peer IDs in the list.

At 510, the information representative of the first set of changes to the list is sent to the hub.

In various implementations, operations 506, 508, and 510 in FIG. 5 can be implemented in association with operations 408, 410, and 412 of FIG. 4. For example, the information representative of the first set of changes to the list that is sent to the hub can include the peer IDs that have been added since the last report and the last received update and/or the peer IDs that have been removed from the list since the last report or the last received update.

In additional examples, the first set of changes provided from a peer matching node to the hub can also include changes to peer metadata that is tracked and stored by the peer matching node (e.g., a change from one state to another). For example, a change to peer metadata can include: a change in a type of P2P protocol being used by a peer device, a change in an IP address being used by a peer device, a change to the amount of data associated with the content ID already obtained, and so forth.

Figure 6:
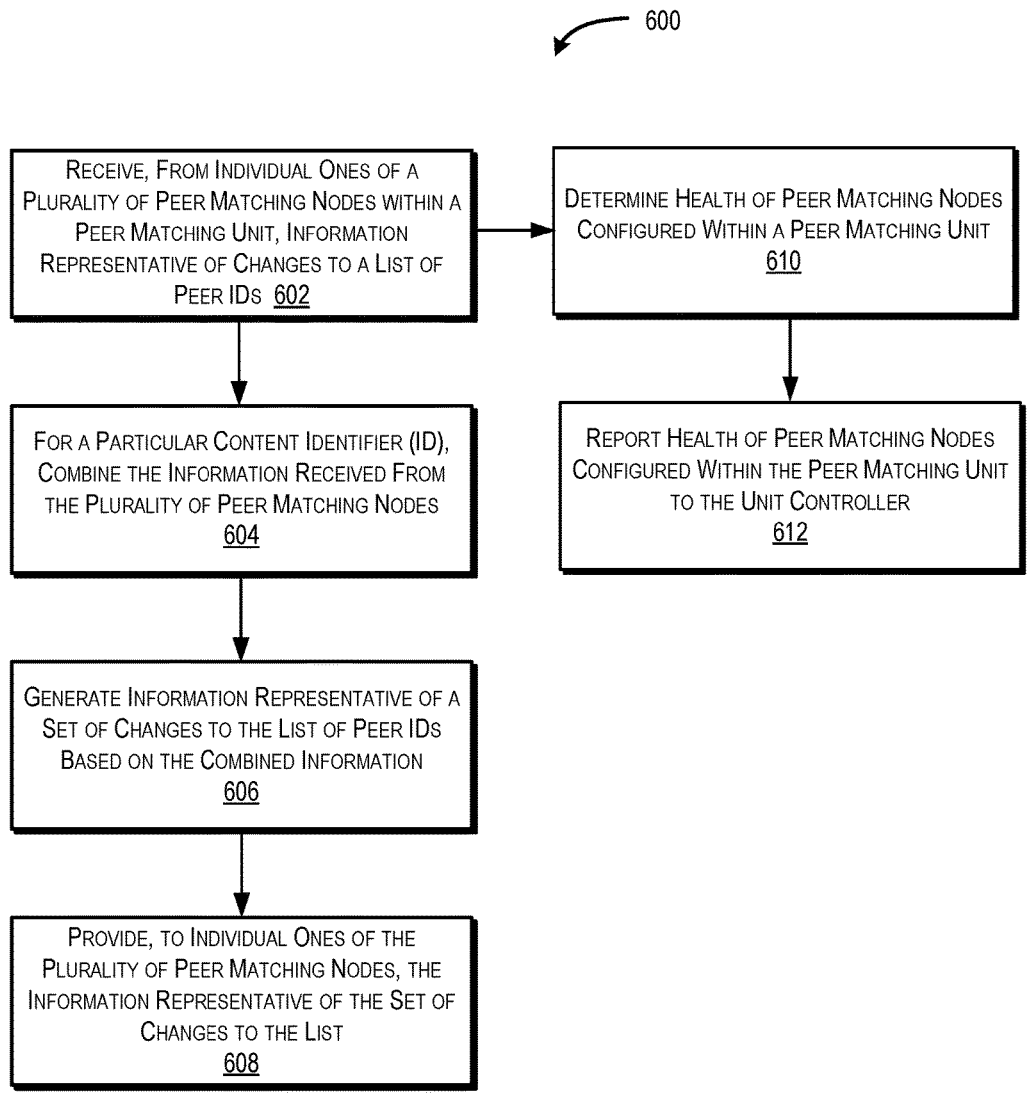
FIG. 6 is a flow diagram of an example process, implemented at a hub, to maintain and update a list of peer identifiers based on information received from multiple peer matching nodes and to provide the list of peer identifiers to various peer matching nodes for peer matching purposes.

FIG. 6 is a flow diagram of an example process 600, implemented at a hub (e.g., hub 104), to maintain and update a list of peer identifiers and to provide the list of peer identifiers to various peer matching nodes for peer matching purposes. The example process 600 can be implemented in association with various elements illustrated in FIGS. 1-3.

At 602, information representative of changes to a list is received from individual ones of a plurality of peer matching nodes (e.g., the first set of changes describes with respect to FIG. 3 and/or FIG. 4 is received). For example, the hub 104 can receive the information, from each peer matching node, in accordance with a periodic reporting schedule. In another example, the hub can receive the information from each of the peer matching nodes after broadcasting a reporting instruction to all the peer matching nodes. In yet another example, the hub can receive the information from individual ones of the peer matching nodes at different times and based on different trigger events realized at the different peer matching node (e.g., a peer matching node realizing a threshold number of changes to a list).

At 604, the information received is combined, for a particular content ID. For example, the hub 104 can combine the respective changes received from all the peer matching nodes within a given time period.

At 606, information representative of a set of changes to a list, for the particular content ID, is generated based on the combined information (e.g., the second set of changes describes with respect to FIG. 3 and/or FIG. 4). In various implementations, the hub 104 associates a version number with a current instance of the changes to the list (e.g., the hub 104 increments a previous version number by one and assigns the new version number to the current update so a sequence of updates can be determined).

At 608, the information representative of the set of changes to the list, for the particular content ID, is provided to individual ones of the plurality of peer matching nodes. Consequently, the peer matching nodes can then respectively update their versions of the lists stored locally at the peer matching nodes, and provide the updated list to the subset of peer devices within the swarm that have registered with each peer matching node.

In various examples, the information representative of the changes to the list can be provided with the version number associated with the changes to the list. The version number can be useful when and if a particular peer matching node was previously unavailable (e.g., offline, failed) to receive the information representative of the changes to the list. Thus, the particular peer matching node can issue a request to the hub with the last known version number to which the particular peer matching node is aware. The hub can receive the request with the last known version number and compare it to a current version number for the list maintained at the hub. If the compared version numbers do not match, the hub can determine which (e.g., how many) updates the particular peer matching node missed and subsequently provide information representative of the changes for the missed version number(s) to the particular peer matching node. The information may correspond to changes for a single version number or multiple version numbers (e.g., two, three, four, eight, ten, etc.), depending on how many updates the particular peer matching node missed.

In various examples, a particular peer matching node that has failed and restarted can alternatively issue a request to receive the complete list of peer IDs for a content ID (e.g., all the peer IDs irrespective of recent changes). The hub can receive the request and provide the complete list to the particular peer matching node.

At 610, the health of the peer matching nodes configured within a peer matching unit can be determined. For example, the health can be monitored by the hub 104, or the health can be determined based on various reports provided to the hub 104 by the peer matching nodes. That is, information representative of changes to a list provided to the hub 104 can also include health information such as a number of currently registered peer devices, an amount of available processing resources, an amount of available memory resources, and/or an amount of available networking resources. In various implementations, the hub 104 can determine the amount of available resources relative to the number of currently registered peer devices reported by individual ones of the peer matching nodes 106(1) . . . 106N).

At 612, the health of the peer matching nodes configured within the peer matching unit can be reported to the unit controller.

FIG. 7 is a block diagram depicting an example environment 700 in which a unit controller 702 is configured to manage a group of active peer matching units 704(1) . . . 704(J), where J is a positive integer number. The group of peer matching units 704(1) . . . 704(J) are "active" because they have each been assigned one or more content IDs, and are tasked with handling peer matching requests for the assigned content IDs.

For instance, in various examples, the unit controller 702 is configured to manage peer matching for content that is available for peer devices to download via P2P sharing and P2P transfer. A content provider may operate the unit controller 702, or inform the unit controller 702, of the content IDs that are available for P2P sharing and P2P transfer. Accordingly, the unit controller 702 is configured to assign an individual content ID of various content IDs to one or more active peer matching units. The unit controller 702 then provides the content ID assignments to a discovery service 706, as referenced by 708. The discovery service 706 is configured to store the content ID to peer matching unit mappings 710. Subsequently, peer devices 712(1) . . . 712(I) (where I is a positive integer number that could include thousands or peer devices, tens of thousands of peer devices, etc.) are individually configured to contact the discovery service 706 to determine which VIP address 714 and/or which active peer matching unit 704(2) should be contacted so that the peer devices 712(1) . . . 712(I) can register for peer matching services for a particular content ID desired to be obtained (e.g., in this example, the desired content ID is assigned to active peer matching unit 704(2)).

The unit controller 702 is further configured to scale requests received amongst a peer matching unit. For example, each active peer matching unit 704(1) . . . 704(J) reports its health status (e.g., available resources) and/or a number of peer devices that have registered within the active peer matching unit to the unit controller 702, as referenced by 716. The unit controller 702 is configured to store and monitor health metrics 718 for individual ones of the active peer matching units 704(1) . . . 704(J) and the number of peer devices 720 registered with individual ones of the active peer matching units 704(1) . . . 704(J). In various examples, the unit controller 702 can sort and/or organize the number of peer devices 720 according to content IDs (e.g., a first number of peer devices can be associated with a first content ID, a second number of peer devices can be associated with a second content ID, and so forth). This can be considered when requests are scaled (e.g., which content IDs should be reassigned).

In various implementations, the unit controller 702, based on an evaluation of the health metrics 718 and/or a number of peer devices 720 registered, can determine that a particular active peer matching unit 704(2) is overloaded. For instance, the active peer matching unit 704(2) may realize an increase in a number of registered peer devices as referenced by 722, and the number of registered peer devices may be more than expected or predicted (e.g., due to a rush to obtain the content). Consequently, the unit controller 702 can implement an action to scale the increased number of peer devices 720 that have registered within the peer matching unit 704(2) across other peer matching units. In one example, the unit controller 702 can compare the number of peer devices 720 to a threshold number of peer devices established for scaling purposes, and if the number of peer devices 720 exceeds the threshold, the unit controller 702 can implement the scaling action.

In one example, the action implemented by the unit controller 702 can comprise reassigning a content ID (e.g., of multiple assigned content IDs) from the active peer matching unit 704(2) that is overloaded and that is potentially unhealthy to another active peer matching unit (e.g., 704(1) or 704(J)) that is not overloaded and that is healthy. This ultimately reduces the number of peer devices that have registered with peer matching nodes configured within the active peer matching unit 704(2).

In another example, the action implemented by the unit controller 702 can comprise activating one of various overflow peer matching units 724(1) . . . 724(H) that are standing by for overload scenarios, as referenced by 726. Therefore, the unit controller 702 can reassign a content ID (e.g., of multiple assigned content IDs) from the active peer matching unit 704(2) that is overloaded and that is potentially unhealthy to an overflow peer matching unit 724(1) that has recently been activated to scale requests and to reduce the number of peer devices that have registered with peer matching nodes configured within the active peer matching unit 704(2).

FIG. 8 is a block diagram of a unit controller device 800 depicting additional details of a unit controller (e.g., the unit controller 702 illustrated in FIG. 7). The unit controller device 800 also includes one or more processor(s) 802 and memory 804, as well as network interface(s) 806 so that the unit controller device 800 can communicate with peer matching units (e.g., the peer matching units 704(1) . . . 704(J) in FIG. 7) and a discover service (e.g., the discovery service 706 in FIG. 7). The processor(s) 802 and/or the memory 804 can be one of the example processor(s) 202 and/or example memory 204 described above with respect to FIG. 2.

The memory 804 includes a content assignment module 808, a health monitoring module 810, a scaling module 812, and a datastore that maintains health information for peer matching units under management of the unit controller 702.

The content assignment module 808 is configured to determine assignments for various content IDs and provide the assignments to the discovery service 706 so the assignments can be discovered by peer devices that want to obtain content via P2P sharing and P2P transfer. The content assignment module 808 is also configured to update a datastore associated with a unit controller device 800 so that health information can be tracked and monitored. Accordingly, FIG. 8 illustrates that a first peer matching unit ID 814 is assigned one or more first content IDs 816, that a second peer matching unit ID 818 is assigned one or more second content IDs 820, and that a third peer matching unit ID 822 is assigned one or more third content IDs 824.

The health monitoring module 810 is configured to receive health status reports from peer matching units, where a health status report includes health metrics and a number of peer devices that have registered within an active peer matching unit. The health monitoring module 810 is configured to store health information based on the received reports. Accordingly, FIG. 8 illustrates that first health information 826 is stored and continually updated for the first peer matching unit ID 814, that second health information 828 is stored and continually updated for the second peer matching unit ID 818, and that third health information 830 is stored and continually updated for the third peer matching unit ID 822.

The scaling module 812 is configured to evaluate the health information for the respective peer matching units and determine that a particular active peer matching unit (e.g., peer matching unit 704(2)) is overloaded. The scaling module 812 can then implement an action to scale the number of devices that have registered with peer matching nodes configured within the overloaded peer matching unit. In various implementations, the scaling module 812 uses pre-defined thresholds 832 for evaluation and determination purposes. For example, the scaling module 812 can compare a current number of registered devices to a threshold number of registered devices to determine that a peer matching unit is overloaded (e.g., if the current number is greater than the threshold number). In another example, the scaling module 812 can compare a current amount of available resources within a peer matching unit (e.g., processing resources, memory resources, networking resources, or a combination thereof) to a threshold amount of available resources to determine that the peer matching unit is overloaded (e.g., if the current amount is less than the threshold amount).

Figure 9:
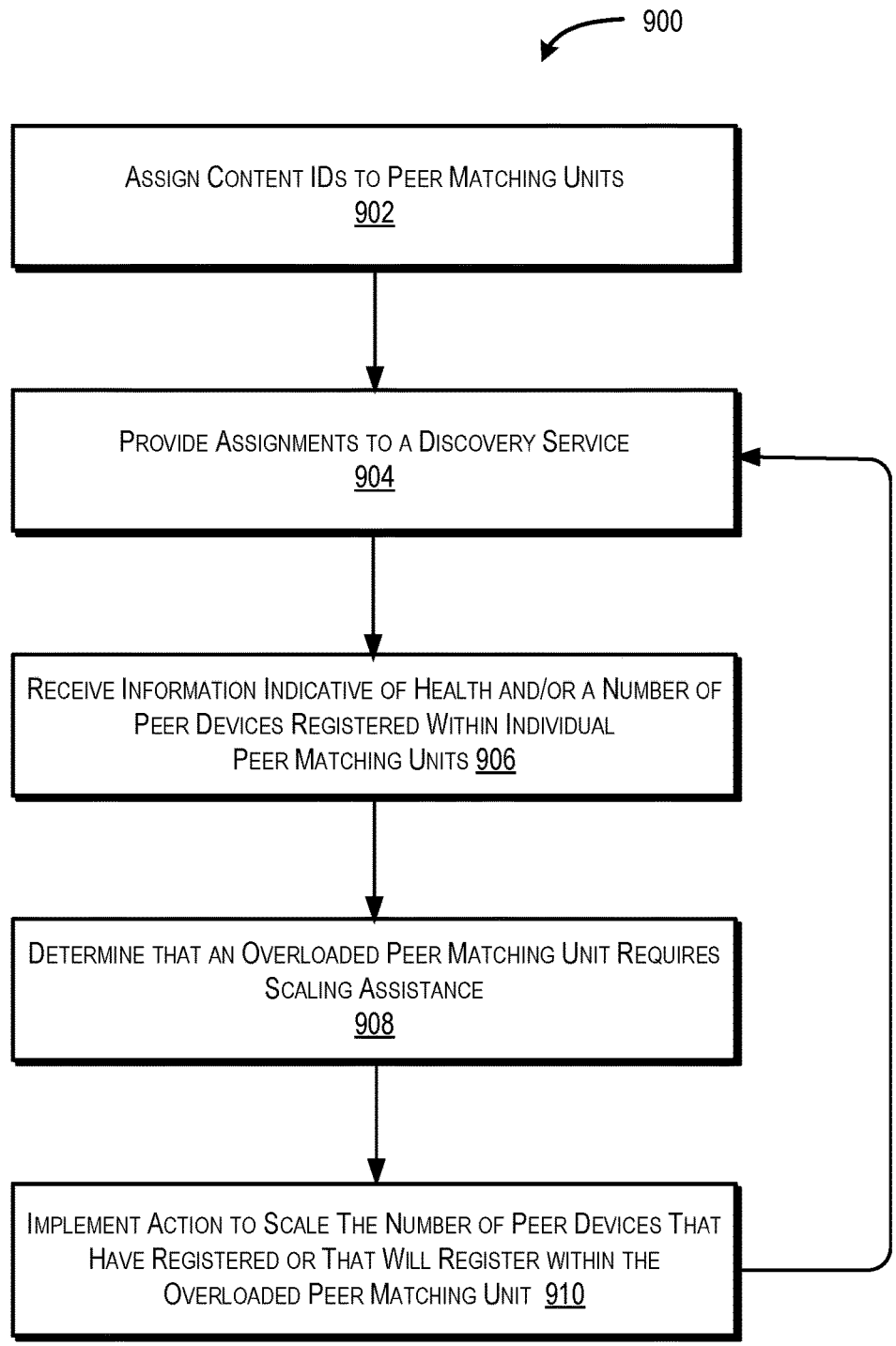
FIG. 9 is a flow diagram of an example process, implemented at a unit controller, to scale requests amongst peer matching units.

FIG. 9 is a flow diagram of an example process 900, implemented at a unit controller (e.g., unit controller 702), to scale requests amongst peer matching units. The example process 900 can be implemented in association with various elements illustrated in FIGS. 7 and 8, for example.

At 902, content IDs are assigned to peer matching units. For instance, the unit controller 702, operated by a content provider, can receive content IDs associated with various pieces of content available for P2P sharing and P2P transfer and can assign the content IDs to a peer matching unit.

In various examples, the unit controller 702 can determine and configure a number of peer matching nodes for a peer matching unit. This can be based on a number of registration requests expected, or predicted, to be received from peer devices. The expected number of registration requests can be for a particular time interval and the expected number of registration requests can be determined based on considerations of the individual content IDs assigned to the peer matching unit for peer matching purposes. The number of peer matching nodes defined for, and configured within, the peer matching unit can also be based on an optimum operating capacity of an individual peer matching node.

At 904, the assignments are provided to a discovery service so the assignments can be discovered by peer devices that want to obtain content via P2P sharing and P2P transfer.

At 906, information (e.g., reports) indicative of health and/or a number of peer devices registered within individual peer matching units is received. Moreover, the information can be stored in association with a peer matching unit ID.

At 908, it is determined that a peer matching unit requires scaling assistance. For instance, the unit controller 702 can use pre-defined thresholds 832 to determine that a peer matching unit is overloaded and requires scaling assistance. A current number of registered devices can be compared to a threshold number of registered devices to determine that a peer matching unit is overloaded and requires scaling assistance. Or, a current amount of available resources within a peer matching unit can be compared to a threshold amount of available resources to determine that a peer matching unit is overloaded and requires scaling assistance.

At 910, an action to scale the number of peer devices that have registered within the overloaded peer matching unit is implemented. In one example, the unit controller 702 can activate an overflow peer matching unit and reassign a content ID (e.g., or multiple content IDs) from the overloaded peer matching unit to the activated overflow peer matching unit to reduce the number of peer devices that have registered with peer matching nodes configured within the overloaded peer matching unit. In another example, the unit controller 702 can reassign a content ID (e.g., or multiple content IDs) from the overloaded peer matching unit to another peer matching unit that is already active, yet healthy and not overloaded, to reduce the number of peer devices that have registered with peer matching nodes configured within the peer matching unit.

In one implementation, a content ID that is reassigned can be completely reassigned such that the overloaded peer matching unit is no longer configured to handle registration requests for the content ID (e.g., the content ID is no longer assigned to the overloaded peer matching unit). In an alternative implementation, a content ID that is reassigned can be split amongst the overloaded peer matching unit and a new peer matching unit (e.g., a new active peer matching unit, a recently activated overflow peer matching unit, etc.) so that both peer matching units are configured to handle registration requests for the content ID (e.g., the content ID is assigned to more than one peer matching unit).

After a content ID is reassigned, the example process 900 returns to operation 904 where the discover service is provided with the updated assignment.

Figure 10:
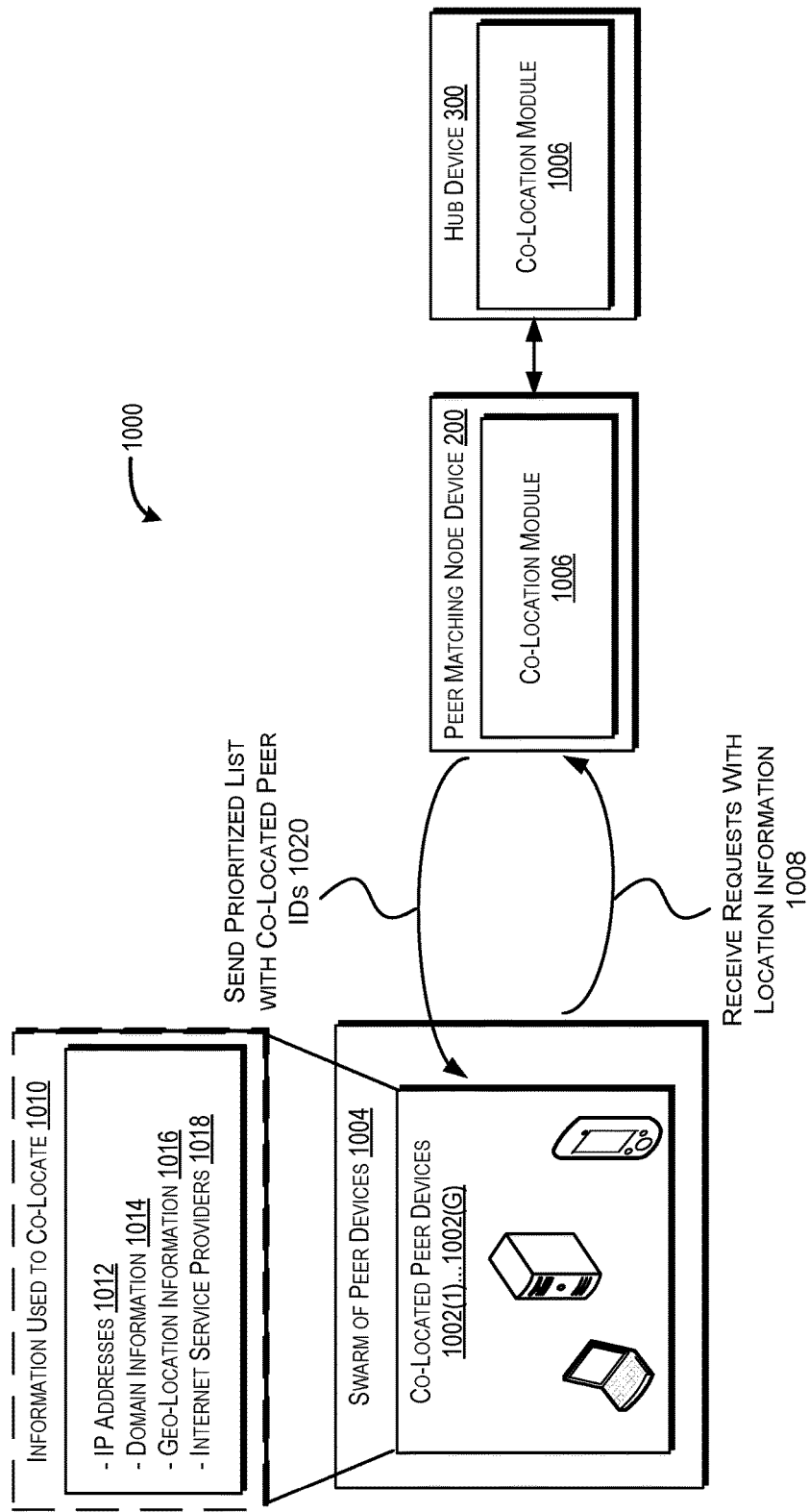
FIG. 10 is a block diagram depicting an example environment in which a subset of peer devices can be associated with co-location information so peer-to-peer sharing of content and peer-to-peer transfer of the content can be efficiently implemented.

FIG. 10 is a block diagram depicting an example environment 1000 in which a subset of peer devices 1002(1) . . . 1002(G) (where G is a positive integer number) can be determined to be co-located so P2P sharing of content and P2P transfer of the content can be efficiently implemented. The co-located peer devices 1002(1) . . . 1002(G) can be a subset of a larger set of peer devices 1004 (e.g., a swarm of peer devices that have registered with peer matching nodes configured within a peer matching unit). Co-locating peer devices improves the efficiency at which the peer devices can obtain (e.g., download) content via P2P sharing and P2P transfer.

FIG. 10 illustrates a peer matching node device 200 (from FIG. 2) and a hub device 300 (e.g., from FIG. 3). The peer matching node device 200 and the hub device 300 can interact with each other, and work with each other, to determine if a subset of devices 1002(1) . . . 1002(G) are co-located. In alternative implementations, the co-location functionality described herein can be implemented by either the peer matching node device 200 or the hub device 300. Therefore, the peer matching node device 200 and/or the hub device 300 include a co-location module 1006.

The co-location module 1006 is configured to determine whether a subset of devices are co-located (e.g., co-located peer devices 1002(1) . . . 1002(G)). The co-location module 1006 is configured to receive, from the swarm of peer devices 1004, location information 1010, as referenced by 1008, and to use the received location information 1010 to create co-located subsets. In various examples, the location information 1010 used by the co-location module 1006 to co-locate a subset of peer devices 1002(1) . . . 1002(G) can comprise IP addresses 1012, domain information 1014, geo-location information 1016, Internet Service Providers (ISPs) 1018, or a combination thereof. In some implementations, the co-location module 1006 can use the aforementioned information to derive a distance between devices and to define "close" peers as co-located peers based on the derived distance. The co-location module 1006 can then prioritize co-located peer identifiers in a list of peer identifiers and send the prioritized list of peer identifiers to the co-located peer devices 1002(1) . . . 1002(G), as referenced by 1020, so that they can attempt to establish a P2P connection with one another to obtain content before attempting to establish a P2P connection with other peer devices in the larger swarm of peer devices 1004.

The IP addresses 1012, the domain information 1014, the geo-location information 1016, and/or the Internet Service Providers (ISPs) 1018 can indicate proximity of the subset of peer devices 1002(1) . . . 1002(G) (e.g., that the subset of peer devices is located within a predefined distance threshold based on the derived distances between) and/or can indicate that the subset of peer devices 1002(1) . . . 1002(G) is part of a same domain or use a same ISP. In some examples, the location information 1010 can be used to determine that two devices are located in a same building or facility (e.g., same house, same business suite, same enterprise campus, same educational campus, etc.). Moreover, in various examples, the co-location module 1006 can use the location information to determine that the subset of peer devices 1002(1) . . . 1002(G) are capable of implementing peer-to-peer transfer of content associated with the content identifier within an internal network and without using networking equipment (e.g., a router) that routes data from the internal network to an external network. It can be more cost effective and can save more time to obtain content from a peer device that is proximate to another peer device (e.g., geographically), to obtain content from a peer device that is part of a same network domain as another peer device, and/or to obtain content from a peer device without using an external network.

Figure 11:
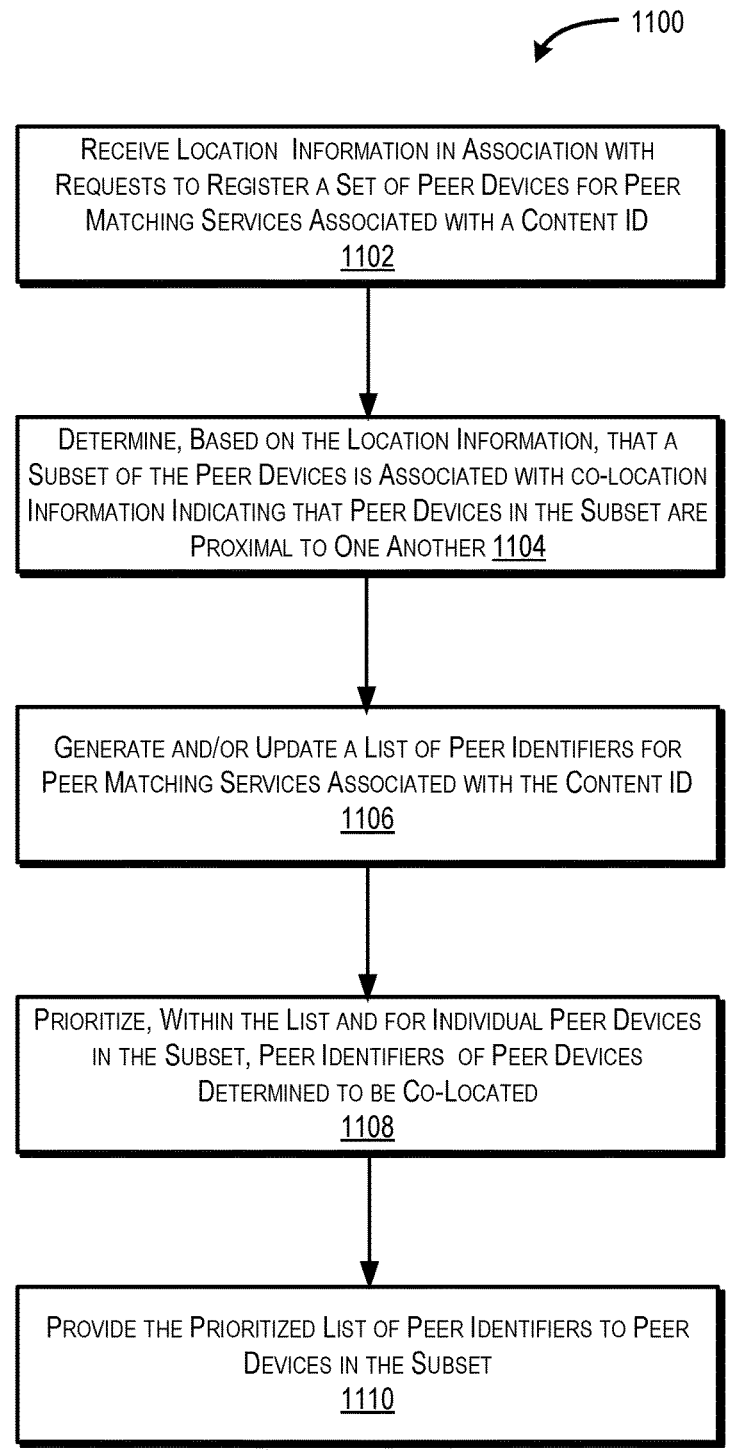
FIG. 11 is a flow diagram of an example process to co-locate a subset of peer devices.

FIG. 11 is a flow diagram of an example process 1100 to co-locate a subset of peer devices (e.g., peer devices 1002(1) . . . 1002(G)). The example process 1100 can be implemented in association with various elements illustrated in FIG. 10, for example.

At 1102, location information is received in association with requests to register a set of peer devices for peer matching services associated with a content ID (e.g., the set of peer devices can comprise a swarm).

At 1104, it is determined, based on the location information, that a subset of the larger set of peer devices is associated with co-location information that indicates peer devices in the subset are proximal to one another. For example, the IP addresses, domain information, geo-location information, and/or ISPs can be examined and determined to be associated with peer devices within a predefined threshold distance of one another. In another example, the IP addresses, domain information, geo-location information, and/or ISPs can be examined and determined to be associated with peer devices that are part of a same domain.

At 1106, a list of peer identifiers for peer matching services associated with the content ID is generated and/or updated (e.g., the list as described above).

At 1108, the list of peer identifiers is prioritized, for the peer devices that are determined to be co-located, such that peer identifiers corresponding to peer devices included in the subset of co-located peer devices are placed over other peer identifiers corresponding to other peer devices that are not included in the subset of co-located peer devices.

At 1110, the prioritized list of peer identifiers is provided to the peer devices in the subset of co-located peer devices.

EXAMPLE CLAUSES

Example A, one or more devices comprising: one or more processors; memory storing a list of peer identifiers corresponding to a set of peer devices that have registered with a plurality of peer matching nodes for peer matching services associated with a content identifier; and one or more modules stored on the memory and executable by the one or more processors to: receive, from the set of peer devices, location information in association with requests to register the set of peer devices with the plurality of peer matching nodes for peer matching services associated with the content identifier; determine, based at least in part on the location information, that a subset of the set of peer devices is associated with co-location information indicating that peer devices in the subset are proximal to one another; and provide, to individual peer devices included in the subset, a list of first peer identifiers associated with other peer devices included in the subset.

Example B, the one or more devices of Example A, wherein the one or more modules are further executable by the one or more processors to provide, to the individual peer devices in the subset, a prioritized list of peer identifiers associated with the set of peer devices, the prioritized list placing the first peer identifiers associated with the other peer devices included in the subset over second peer identifiers associated with peer devices not included in the subset.

Example C, the one or more devices of Example A or Example B, wherein: the location information comprises at least one of Internet Protocol (IP) addresses, geo-location information, or an Internet Service Provider; and the subset of peer devices are determined to be associated with the co-location information based at least in part on corresponding IP addresses, geo-location information, or Internet Service Providers indicating that the subset of peer devices is within a predefined distance threshold.

Example D, the one or more devices of Example A or Example B, wherein: the location information comprises domain information; and the subset of peer devices are determined to be associated with the co-location information based at least in part on corresponding domain information indicating that the subset of peer devices is part of a same domain.

Example E, the one or more devices of any one of Example A through Example D, wherein the set of peer devices comprises a swarm, and the list is used to avoid swarm fragmentation.

Example F, the one or more devices of any one of Example A through Example E, wherein the subset of peer devices are positioned to implement peer-to-peer transfer of content associated with the content identifier with each other more efficiently than with peer devices not included in the subset.

Example G, the one or more devices of Example A, wherein the co-location information indicates that the subset of peer devices are capable of implementing peer-to-peer transfer of content associated with the content identifier within an internal network and without using networking equipment that routes data from the internal network to an external network.

Example H, the one or more devices of Example G, wherein the networking equipment comprises a router.

Example I, a method comprising: receiving, from a set of peer devices, location information in association with requests to register the set of peer devices with a plurality of peer matching nodes for peer matching services associated with a content identifier; determining, based at least in part on the location information, that a subset of the set of peer devices is associated with co-location information indicating that peer devices in the subset are proximal to one another; and providing, to individual peer devices included in the subset, a list of first peer identifiers associated with other peer devices included in the subset.

Example J, the method of Example I, further comprising providing, to the individual peer devices in the subset, a prioritized list of peer identifiers associated with the set of peer devices, the prioritized list placing the first peer identifiers associated with the other peer devices included in the subset over second peer identifiers associated with peer devices not included in the subset.

Example K, the method of Example I or Example J, wherein: the location information comprises at least one of Internet Protocol (IP) addresses, geo-location information, or an Internet Service Provider; and the subset of peer devices are determined to be associated with the co-location information based at least in part on corresponding IP addresses, geo-location information, or Internet Service Providers indicating that the subset of peer devices is within a predefined distance threshold.

Example L, the method of Example I or Example J, wherein: the location information comprises domain information; and the subset of peer devices are determined to be associated with the co-location information based at least in part on corresponding domain information indicating that the subset of peer devices is part of a same domain.

Example M, the method of any one of Example I through Example L, wherein the subset of peer devices are positioned to implement peer-to-peer transfer of content associated with the content identifier with each other more efficiently than with peer devices not included in the subset.

Example N, the method of Example I, wherein the co-location information indicates that the subset of peer devices are capable of implementing peer-to-peer transfer of content associated with the content identifier within an internal network and without using network equipment (e.g., a router) that routes data from the internal network to an external network.

Example O, one or more computer storage media comprising instructions that, when executed by one or more processors, configure a device to perform operations comprising: receiving, from a set of peer devices, location information in association with requests to register the set of peer devices with a plurality of peer matching nodes for peer matching services associated with a content identifier; determining, based at least in part on the location information, that a subset of the set of peer devices is associated with co-location information indicating that peer devices in the subset are proximal to one another; and providing, to individual peer devices included in the subset, a list of first peer identifiers associated with other peer devices included in the subset.

Example P, the one or more computer storage media of Example O, the operations further comprising providing, to the individual peer devices in the subset, a prioritized list of peer identifiers associated with the set of peer devices, the prioritized list placing the first peer identifiers associated with the other peer devices included in the subset over second peer identifiers associated with peer devices not included in the subset.

Example Q, the one or more computer storage media of Example O or Example P, wherein: the location information comprises at least one of Internet Protocol (IP) addresses, geo-location information, or an Internet Service Provider; and the subset of peer devices are determined to be associated with the co-location information based at least in part on corresponding IP addresses, geo-location information, or Internet Service Providers indicating that the subset of peer devices is within a predefined distance threshold.

Example R, the one or more computer storage media of Example O or Example P, wherein: the location information comprises domain information; and the subset of peer devices are determined to be associated with the co-location information based at least in part on corresponding domain information indicating that the subset of peer devices is part of a same domain.

Example S, the one or more computer storage media of any one of Example O through Example R, wherein the subset of peer devices are positioned to implement peer-to-peer transfer of content associated with the content identifier with each other more efficiently than with peer devices not included in the subset.

Example T, the one or more computer storage media of Example O, wherein the co-location information indicates that the subset of peer devices are capable of implementing peer-to-peer transfer of content associated with the content identifier within an internal network and without using network equipment (e.g., a router) that routes data from the internal network to an external network.

CONCLUSION

Although the present disclosure may use language that is specific to structural features and/or methodological acts, the invention is not limited to the specific features or acts described herein. Rather, the specific features and acts are disclosed as illustrative forms of implementing the invention.

What is claimed is:

1. One or more devices comprising:
   one or more processors;
   memory storing a list of peer identifiers corresponding to a set of peer devices that have been grouped together for peer matching services associated with a same content identifier; and
   one or more modules stored on the memory and executable by the one or more processors to:
      receive, from the set of peer devices, location information in association with requests to register the set of peer devices for the peer matching services;
      determine, based at least in part on the location information, that a subset of the set of peer devices is associated with co-location information indicating that peer devices in the subset of the set of peer devices are proximal to one another;
      provide, to individual peer devices included in the subset of the set of peer devices, a list of first peer identifiers associated with other peer devices included in the subset of the set of peer devices; and
      implement peer-to-peer transfer of content associated with the content identifier using the subset of the set of peer devices rather than using peer devices not included in the subset of the set of peer devices, wherein at least one peer device in the subset of the set of peer devices transmits the content and at least one other peer device in the subset of the set of peer devices receives the content.

2. The one or more devices of claim 1, wherein the one or more modules are further executable by the one or more processors to provide, to the individual peer devices in the subset of the set of peer devices, a prioritized list of peer identifiers associated with the set of peer devices, the prioritized list placing the first peer identifiers associated with the other peer devices included in the subset of the set of peer devices over second peer identifiers associated with peer devices not included in the subset of the set of peer devices.

3. The one or more devices of claim 1, wherein:
   the location information comprises at least one of Internet Protocol (IP) addresses, geo-location information, or an Internet Service Provider; and
   the subset of the set of peer devices are determined to be associated with the co-location information based at least in part on corresponding IP addresses, geo-location information, or Internet Service Providers indicating that the subset of the set of peer devices is within a predefined distance threshold.

4. The one or more devices of claim 1, wherein:
the location information comprises domain information; and
the subset of the set of peer devices are determined to be associated with the co-location information based at least in part on corresponding domain information indicating that the subset of the set of peer devices is part of a same domain.

5. The one or more devices of claim 1, wherein the set of peer devices comprises a swarm, and the list is used to avoid swarm fragmentation.

6. The one or more devices of claim 1, wherein the co-location information indicates that the subset of the set of peer devices are capable of implementing peer-to-peer transfer of the content associated with the content identifier within an internal network and without using networking equipment that routes data from the internal network to an external network.

7. The one or more devices of claim 6, wherein the networking equipment comprises a router.

8. A method comprising:
receiving, from a set of peer devices, location information in association with requests to register the set of peer devices for peer matching services associated with a same content identifier;
determining, based at least in part on the location information, that a subset of the set of peer devices is associated with co-location information indicating that peer devices in the subset of the set of peer devices are proximal to one another;
providing, to individual peer devices included in the subset of the set of peer devices, a list of first peer identifiers associated with other peer devices included in the subset; and
implementing peer-to-peer transfer of content associated with the content identifier using the subset of the set of peer devices rather than using peer devices not included in the subset of the set of peer devices, wherein at least one peer device in the subset of the set of peer devices transmits the content and at least one other peer device in the subset of the set of peer devices receives the content.

9. The method of claim 8, further comprising providing, to the individual peer devices in the subset of the set of peer devices, a prioritized list of peer identifiers associated with the set of peer devices, the prioritized list placing the first peer identifiers associated with the other peer devices included in the subset of the set of peer devices over second peer identifiers associated with peer devices not included in the subset of the set of peer devices.

10. The method of claim 8, wherein:
the location information comprises at least one of Internet Protocol (IP) addresses, geo-location information, or an Internet Service Provider; and
the subset of the set of peer devices are determined to be associated with the co-location information based at least in part on corresponding IP addresses, geo-location information, or Internet Service Providers indicating that the subset of the set of peer devices is within a predefined distance threshold.

11. The method of claim 8, wherein:
the location information comprises domain information; and
the subset of the set of peer devices are determined to be associated with the co-location information based at least in part on corresponding domain information indicating that the subset of the set of peer devices is part of a same domain.

12. The method of claim 8, wherein the subset of the set of peer devices are positioned to implement the peer-to-peer transfer of the content associated with the content identifier with each other more efficiently than with the peer devices not included in the subset of the set of peer devices.

13. The method of claim 8, wherein the co-location information indicates that the subset of the set of peer devices are capable of implementing the peer-to-peer transfer of the content associated with the content identifier within an internal network and without using network equipment that routes data from the internal network to an external network.

14. The method of claim 13, wherein the networking equipment comprises a router.

15. One or more computer storage media comprising instructions that, when executed by one or more processors, configure a device to perform operations comprising:
receiving, from a set of peer devices, location information in association with requests to register the set of peer devices for peer matching services associated with a same content identifier;
determining, based at least in part on the location information, that a subset of the set of peer devices is associated with co-location information indicating that peer devices in the subset of the set of peer devices are proximal to one another;
providing, to individual peer devices included in the subset of the set of peer devices, a list of first peer identifiers associated with other peer devices included in the subset of the set of peer devices; and
implementing peer-to-peer transfer of content associated with the content identifier using the subset of the set of peer devices rather than using peer devices not included in the subset of the set of peer devices, wherein at least one peer device in the subset of the set of peer devices transmits the content and at least one other peer device in the subset of the set of peer devices receives the content.

16. The one or more computer storage media of claim 15, the operations further comprising providing, to the individual peer devices in the subset of the set of peer devices, a prioritized list of peer identifiers associated with the set of peer devices, the prioritized list placing the first peer identifiers associated with the other peer devices included in the subset of the set of peer devices over second peer identifiers associated with peer devices not included in the subset of the set of peer devices.

17. The one or more computer storage media of claim 15, wherein:
the location information comprises at least one of Internet Protocol (IP) addresses, geo-location information, or an Internet Service Provider; and
the subset of the set of peer devices are determined to be associated with the co-location information based at least in part on corresponding IP addresses, geo-location information, or Internet Service Providers indicating that the subset of the set of peer devices is within a predefined distance threshold.

18. The one or more computer storage media of claim 15, wherein:
the location information comprises domain information; and
the subset of the set of peer devices are determined to be associated with the co-location information based at least in part on corresponding domain information indicating that the subset of the set of peer devices is part of a same domain.

19. The one or more computer storage media of claim 15, wherein the subset of the set of peer devices are positioned to implement the peer-to-peer transfer of the content associated with the content identifier with each other more efficiently than with the peer devices not included in the subset.

20. The one or more computer storage media of claim 15, wherein the co-location information indicates that the subset of the set of peer devices are capable of implementing the peer-to-peer transfer of the content associated with the content identifier within an internal network and without using network equipment that routes data from the internal network to an external network.

\* \* \* \* \*